(12) United States Patent
Dementyev et al.

(10) Patent No.: US 12,192,241 B2
(45) Date of Patent: Jan. 7, 2025

(54) NETWORK ACCESS CONTROL INTENT-BASED POLICY CONFIGURATION

(71) Applicant: Juniper Networks, Inc., Sunnyvale, CA (US)

(72) Inventors: Viacheslav Dementyev, Brno (CZ); Kesavan Kazhiyur Mannar, Milpitas, CA (US); Madhava Rao Cheethirala, San Jose, CA (US); Natarajan Manthiramoorthy, Fremont, CA (US); Raja Rao Tadimeti, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 280 days.

(21) Appl. No.: 17/937,208

(22) Filed: Sep. 30, 2022

(65) Prior Publication Data

US 2023/0403305 A1 Dec. 14, 2023

Related U.S. Application Data

(60) Provisional application No. 63/366,382, filed on Jun. 14, 2022.

(51) Int. Cl.
*H04L 9/40* (2022.01)
(52) U.S. Cl.
CPC .......... *H04L 63/20* (2013.01); *H04L 63/0876* (2013.01); *H04L 63/104* (2013.01)
(58) Field of Classification Search
None
See application file for complete search history.

(56) References Cited

U.S. PATENT DOCUMENTS

| | | | |
|---|---|---|---|
| 9,832,082 | B2 | 11/2017 | Dade et al. |
| 10,756,983 | B2 | 8/2020 | Ratkovic et al. |
| 10,862,742 | B2 | 12/2020 | Singh |
| 10,958,537 | B2 | 3/2021 | Safavi |

(Continued)

OTHER PUBLICATIONS

Extended Search Report from counterpart European Application No. 22212247.5 dated May 30, 2023, 7 pp.

(Continued)

*Primary Examiner* — Jeffrey R Swearingen
(74) *Attorney, Agent, or Firm* — Shumaker & Sieffert, P.A.

(57) ABSTRACT

Techniques are described for configuration and application of intent-based network access control (NAC) policies for authentication and authorization of multi-tenant, network access server (NAS) devices to access enterprise networks of organizations. A network management system configures intent-based NAC policies for an organization. A cloud-based NAC system may apply an appropriate intent-based NAC policy in response to an authentication request from a NAS device. The NAC system identifies a vendor of the NAS device, matches incoming attributes in the authentication request to a set of normalized match rules of the intent-based NAC policy, and translates a set of abstracted policy results corresponding to the set of normalized match rules into a vendor-specific set of return attributes based on the vendor of the NAS device. The NAC system sends the vendor-specific set of return attributes to the NAS device to enable the NAS device to access the enterprise network of the organization.

20 Claims, 11 Drawing Sheets

(56) References Cited

U.S. PATENT DOCUMENTS

| | | |
|---|---|---|
| 10,958,585 B2 | 3/2021 | Safavi |
| 10,985,969 B2 | 4/2021 | Safavi |
| 10,992,543 B1 | 4/2021 | Rachamadugu et al. |
| 2009/0158407 A1 | 6/2009 | Nicodemus et al. |
| 2014/0068030 A1* | 3/2014 | Chambers ........... H04L 41/0894 |
| | | 709/220 |
| 2016/0080420 A1* | 3/2016 | Ray ..................... H04L 63/1408 |
| | | 726/1 |
| 2017/0228552 A1 | 8/2017 | Prafullchandra et al. |
| 2018/0004937 A1* | 1/2018 | Shannon ................. H04L 9/088 |
| 2019/0238538 A1* | 8/2019 | Shaw ................. H04L 63/0227 |
| 2019/0238591 A1* | 8/2019 | Shaw .................... H04L 63/029 |
| 2020/0374315 A1* | 11/2020 | Milton .................... G06F 16/27 |
| 2021/0234898 A1 | 7/2021 | Desai et al. |
| 2021/0306201 A1 | 9/2021 | Wang et al. |

OTHER PUBLICATIONS

Response to Extended Search Report dated May 30, 2023, from counterpart European Application No. 22212247.5 filed Jun. 18, 2024, 35 pp.

\* cited by examiner

NETWORK ACCESS CONTROL INTENT-BASED POLICY CONFIGURATION

This application claims the benefit of U.S. Provisional Patent Application No. 63/366,382, filed 14 Jun. 2022, the entire contents of which is incorporated herein by reference.

TECHNICAL FIELD

The disclosure relates generally to computer networks and, more specifically, to managing access to computer networks.

BACKGROUND

Commercial premises or sites, such as offices, hospitals, airports, stadiums, or retail outlets, often install complex wireless network systems, including a network of wireless access points (APs), throughout the premises to provide wireless network services to one or more wireless client devices (or simply, "clients"). APs are physical, electronic devices that enable other devices to wirelessly connect to a wired network using various wireless networking protocols and technologies, such as wireless local area networking protocols conforming to one or more of the IEEE 802.11 standards (i.e., "WiFi"), Bluetooth/Bluetooth Low Energy (BLE), mesh networking protocols such as ZigBee or other wireless networking technologies.

Many different types of wireless client devices, such as laptop computers, smartphones, tablets, wearable devices, appliances, and Internet of Things (IoT) devices, incorporate wireless communication technology and can be configured to connect to wireless access points when the device is in range of a compatible AP. In order to gain access to a wireless network, a wireless client device may first need to authenticate to the AP. Authentication may occur via a handshake exchange between the wireless client device, the AP, and an Authentication, Authorization, and Accounting (AAA) server controlling access at the AP.

SUMMARY

In general, this disclosure describes one or more techniques for configuration and application of intent-based network access control (NAC) policies for authentication and authorization of multi-tenant, network access server (NAS) devices to access enterprise networks of organizations. In accordance with the disclosed techniques, a network management system (NMS), which provides a management plane for one or more cloud-based NAC systems and a plurality of NAS devices associated with one or more organizations, configures intent-based NAC policies for an organization based on user input indicative of network administrator intent. The NAC system providing NAC services for the organization may apply an appropriate intent-based NAC policy of the one or more intent-based NAC policies in response to receipt of an authentication request to access an enterprise network of the organization from a NAS device. The NAC system automatically identifies a vendor of the NAS device based on the authentication request, matches incoming attributes in the authentication request to a set of normalized match rules of the intent-based NAC policy, and translates a set of abstracted policy results corresponding to the set of normalized match rules in the intent-based NAC policy into a vendor-specific set of return attributes based on the vendor of the NAS device. The NAC system then sends the vendor-specific set of return attributes to the NAS device to enable the NAS device to access the enterprise network of the organization.

Traditionally, NAC authentication and authorization policy configuration is a very complex process that requires in-depth knowledge of a particular NAC product by a network administrator for the organization, as well as in-depth understanding of particular AAA protocols, e.g., RADIUS. This complexity exponentially grows with every additional NAS vendor added to the enterprise network, as the network administrator needs to know exactly what type of attributes are used by the particular NAS vendor and device type. This complexity generally results in the network administrator creating unique policy rules and sets of return attributes for each and every NAS vendor and device type, making overall policy management operationally challenging.

The techniques of this disclosure provide one or more technical advantages and practical applications. For example, the disclosed techniques enable creation of NAC policies based on network administrator intent (e.g., who can authenticate to the network, what kind of policies will be applied based on user or device identity and their state, etc.). An intent-based NAC policy comprises a set of normalized match rules with a corresponding set of abstracted policy results that are vendor-agnostic. In some examples, the set of normalized match rules of the intent-based NAC policy includes both authentication rules and authorization rules normalized to be vendor-agnostic. In this way, the disclosed techniques may merge or collapse multiple configuration phases, i.e., authentication policy configuration and authorization policy configuration, into a single configuration phase. The intent-based NAC policy configuration disclosed herein hides the configuration complexity associated with traditional NAC systems from administrators and other end-users, and dramatically improves operational experience when managing NAC systems.

Furthermore, the disclosed techniques enable dynamic vendor learning such that a NAC system may automatically identify vendors of NAS devices based on the authentication requests received from the NAS devices and vendor signatures. The NAC system may automatically configure a first vendor-specific set of return attributes from the intent-based NAC policy based on a first vendor identified for a first NAS device requesting network access. The NAC system may also automatically configure a second vendor-specific set of return attributes from the same intent-based NAC policy based on a second vendor identified for a second NAS device requesting network access. The disclosed techniques dramatically simplify overall NAC policy configuration and operations, especially in large scaled, multi-vendor networks. The techniques also reduce the requirement on the network administrators such that that in-depth AAA or NAC product knowledge is not required.

In one example, this disclose is directed to a system comprising an NMS configured to manage a plurality of multi-vendor, NAS devices associated with one or more organizations, and at least one cloud-based NAC system in communication with the NMS. The at least one NAC system is configured to: obtain one or more intent-based NAC policies of an organization of the one or more organizations from the NMS, wherein the one or more intent-based NAC policies comprise one or more sets of normalized match rules associated with corresponding sets of abstracted policy results that are vendor-agnostic; receive an authentication request for an enterprise network of the organization from a NAS device; identify a vendor of the NAS device based on the authentication request; match one or more incoming attributes included in the authentication request from the NAS device to a set of normalized match rules of an intent-based NAC policy of the one or more intent-based NAC policies; translate a set of abstracted policy results corresponding to the set of normalized match rules of the intent-based NAC policy into a vendor-specific set of return attributes based on the vendor of the NAS device; and send the vendor-specific set of return attributes to the NAS device to enable the NAS device to access the enterprise network of the organization.

In another example, this disclosure is directed to a method comprising obtaining, by a cloud-based NAC system, one or more intent-based NAC policies of an organization from a NMS configured to manage a plurality of multi-vendor, NAS devices associated with the organization, wherein the one or more intent-based NAC policies comprise one or more sets of normalized match rules associated with corresponding sets of abstracted policy results that are vendor-agnostic; receiving, by the NAC system, an authentication request for an enterprise network of the organization from a NAS device; identifying, by the NAC system, a vendor of the NAS device based on the authentication request; matching, by the NAC system, one or more incoming attributes included in the authentication request from the NAS device to a set of normalized match rules of an intent-based NAC policy of the one or more intent-based NAC policies; translating, by the NAC system, a set of abstracted policy results corresponding to the set of normalized match rules of the intent-based NAC policy into a vendor-specific set of return attributes based on the vendor of the NAS device; and sending, by the NAC system, the vendor-specific set of return attributes to the NAS device to enable the NAS device to access the enterprise network of the organization In a further example, this disclosure is directed to a computer-readable storage medium storing instructions that, when executed, cause one or more processors to: obtain, by a cloud-based NAC system, one or more intent-based NAC policies of an organization from a NMS configured to manage a plurality of multi-vendor, NAS devices associated with the organization, wherein the one or more intent-based NAC policies comprise one or more sets of normalized match rules associated with corresponding sets of abstracted policy results that are vendor-agnostic; receive an authentication request for an enterprise network of the organization from a NAS device; identify a vendor of the NAS device based on the authentication request; match one or more incoming attributes included in the authentication request from the NAS device to a set of normalized match rules of an intent-based NAC policy of the one or more intent-based NAC policies; translate a set of abstracted policy results corresponding to the set of normalized match rules of the intent-based NAC policy into a vendor-specific set of return attributes based on the vendor of the NAS device; and send the vendor-specific set of return attributes to the NAS device to enable the NAS device to access the enterprise network of the organization.

The details of one or more examples of the techniques of this disclosure are set forth in the accompanying drawings and the description below. Other features, objects, and advantages of the techniques will be apparent from the description and drawings, and from the claims.

DETAILED DESCRIPTION

Figure 1A:
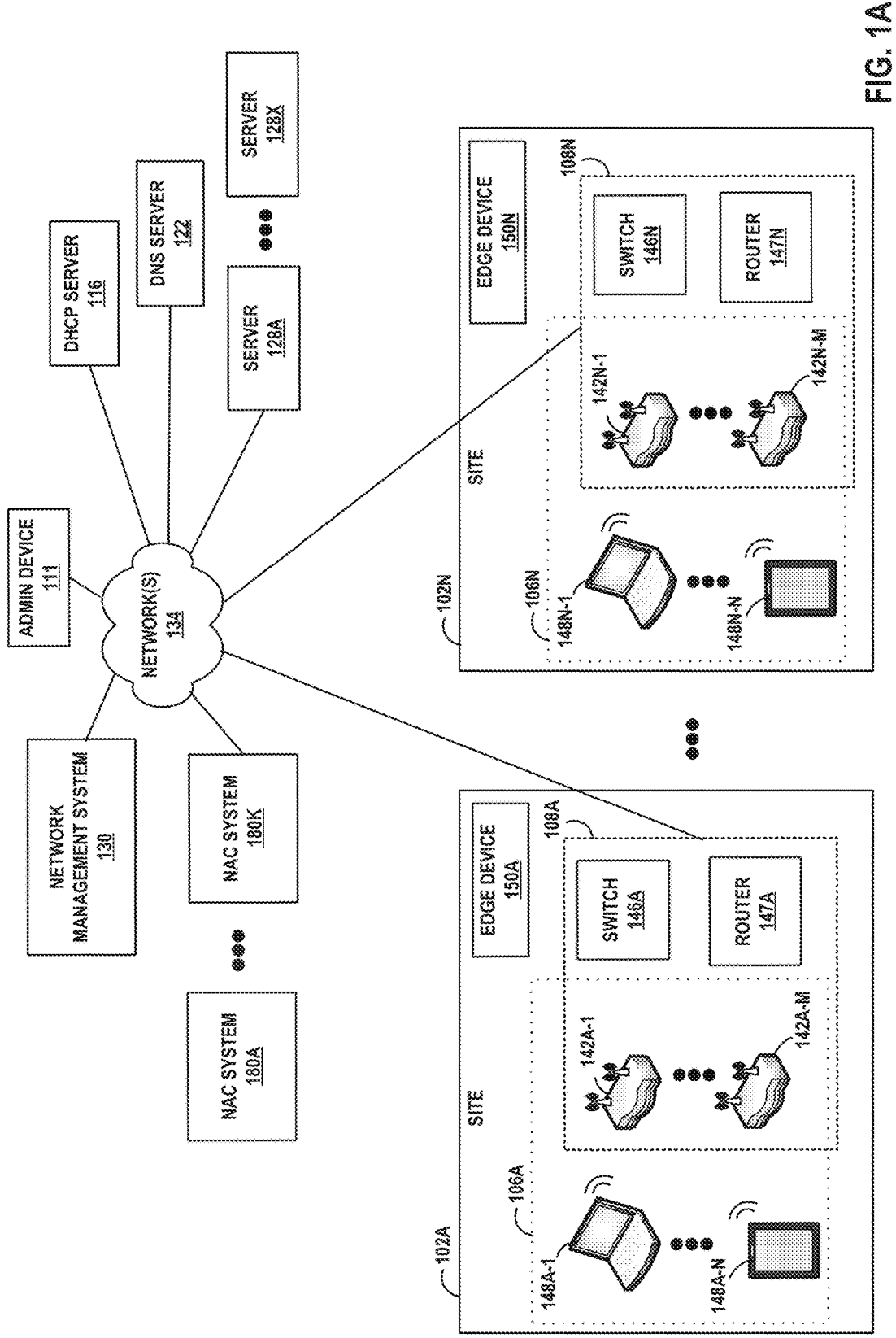
FIG. 1A is a block diagram of an example network system including a network management system and network access control systems, in accordance with one or more techniques of the disclosure.

FIG. 1A is a block diagram of an example network system 100 including network access control (NAC) systems 180A-180K and network management system (NMS) 130, in accordance with one or more techniques of this disclosure. Example network system 100 includes a plurality sites 102A-102N at which a network service provider manages one or more wireless networks 106A-106N, respectively. Although in FIG. 1A each site 102A-102N is shown as including a single wireless network 106A-106N, respectively, in some examples, each site 102A-102N may include multiple wireless networks, and the disclosure is not limited in this respect.

Each site 102A-102N includes a plurality of network access server (NAS) devices 108A-108N, such as access points (APs) 142, switches 146, and routers 147. NAS devices may include any network infrastructure devices capable of authenticating and authorizing client devices to access an enterprise network. For example, site 102A includes a plurality of APs 142A-1 through 142A-M, a switch 146A, and a router 147A. Similarly, site 102N includes a plurality of APs 142N-1 through 142N-M, a switch 146N, and a router 147N. Each AP 142 may be any type of wireless access point, including, but not limited to, a commercial or enterprise AP, a router, or any other device that is connected to a wired network and is capable of providing wireless network access to client devices within the site. In some examples, each of APs 142A-1 through 142A-M at site 102A may be connected to one or both of switch 146A and router 147A. Similarly, each of APs 142N-1 through 142N-M at site 102N may be connected to one or both of switch 146N and router 147N.

Each site 102A-102N also includes a plurality of client devices, otherwise known as user equipment devices (UEs), referred to generally as UEs or client devices 148, representing various wireless-enabled devices within each site. For example, a plurality of UEs 148A-1 through 148A-K are currently located at site 102A. Similarly, a plurality of UEs 148N-1 through 148N-K are currently located at site 102N. Each UE 148 may be any type of wireless client device, including, but not limited to, a mobile device such as a smart phone, tablet or laptop computer, a personal digital assistant (PDA), a wireless terminal, a smart watch, smart ring, or other wearable device. UEs 148 may also include wired client-side devices, e.g., IoT devices such as printers, security devices, environmental sensors, or any other device connected to the wired network and configured to communicate over one or more wireless networks 106.

In order to provide wireless network services to UEs 148 and/or communicate over the wireless networks 106, APs 142 and the other wired client-side devices at sites 102 are connected, either directly or indirectly, to one or more network devices (e.g., switches, routers, gateways, or the like) via physical cables, e.g., Ethernet cables. Although illustrated in FIG. 1A as if each site 102 includes a single switch and a single router, in other examples, each site 102 may include more or fewer switches and/or routers. In addition, two or more switches at a site may be connected to each other and/or connected to two or more routers, e.g., via a mesh or partial mesh topology in a hub-and-spoke architecture. In some examples, interconnected switches 146 and routers 147 comprise wired local area networks (LANs) at sites 102 hosting wireless networks 106.

Example network system 100 also includes various networking components for providing networking services within the wired network including, as examples, NAC systems 180 including or providing access to Authentication, Authorization and Accounting (AAA) servers for authenticating users and/or UEs 148, a Dynamic Host Configuration Protocol (DHCP) server 116 for dynamically assigning network addresses (e.g., IP addresses) to UEs 148 upon authentication, a Domain Name System (DNS) server 122 for resolving domain names into network addresses, a plurality of servers 128A-128X (collectively "servers 128") (e.g., web servers, databases servers, file servers and the like), and NMS 130. As shown in FIG. 1A, the various devices and systems of network 100 are coupled together via one or more network(s) 134, e.g., the Internet and/or an enterprise intranet.

In the example of FIG. 1A, NMS 130 is a cloud-based computing platform that manages wireless networks 106A-106N at one or more of sites 102A-102N. As further described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. In some examples, NMS 130 outputs notifications, such as alerts, alarms, graphical indicators on dashboards, log messages, text/SMS messages, email messages, and the like, and/or recommendations regarding wireless network issues to a site or network administrator ("admin") interacting with and/or operating admin device 111. Additionally, in some examples, NMS 130 operates in response to configuration input received from the administrator interacting with and/or operating admin device 111.

The administrator and admin device 111 may comprise IT personnel and an administrator computing device associated with one or more of sites 102. Admin device 111 may be implemented as any suitable device for presenting output and/or accepting user input. For instance, admin device 111 may include a display. Admin device 111 may be a computing system, such as a mobile or non-mobile computing device operated by a user and/or by the administrator. Admin device 111 may, for example, represent a workstation, a laptop or notebook computer, a desktop computer, a tablet computer, or any other computing device that may be operated by a user and/or present a user interface in accordance with one or more aspects of the present disclosure. Admin device 111 may be physically separate from and/or in a different location than NMS 130 such that admin device 111 may communicate with NMS 130 via network 134 or other means of communication.

In some examples, one or more of NAS devices 108, e.g., APs 142, switches 146, and routers 147, may connect to edge devices 150A-150N via physical cables, e.g., Ethernet cables. Edge devices 150 comprise cloud-managed, wireless local area network (LAN) controllers (WLCs). Each of edge devices 150 may comprise an on-premises device at a site 102 that is in communication with NMS 130 to extend certain microservices from NMS 130 to the on-premises NAS devices 108 while using NMS 130 and its distributed software architecture for scalable and resilient operations, management, troubleshooting, and analytics.

Each one of the network devices of network system 100, e.g., NAC systems 180, servers 116, 122 and/or 128, APs 142, switches 146, routers 147, UEs 148, edge devices 150, and any other servers or devices attached to or forming part of network system 100, may include a system log or an error log module wherein each one of these network devices records the status of the network device including normal operational status and error conditions. Throughout this disclosure, one or more of the network devices of network system 100, e.g., servers 116, 122 and/or 128, APs 142, switches 146, routers 147, and UEs 148, may be considered "third-party" network devices when owned by and/or associated with a different entity than NMS 130 such that NMS 130 does not directly receive, collect, or otherwise have access to the recorded status and other data of the third-party network devices. In some examples, edge devices 150 may provide a proxy through which the recorded status and other data of the third-party network devices may be reported to NMS 130.

In the example of FIG. 1A, each of NAC systems 180 comprises a cloud-based network access control service at multiple, geographically distributed points of presence. Typically, network access control functionality is offered by on-premises appliances that are limited by processing power and memory as well as maintenance and upgrade issues. Offering cloud-based network access control services avoids the limitations and improves network administration. A centralized, cloud-based deployment of network access control, however, introduces issues with latency and failures that may block client devices from network access.

In accordance with the disclosed techniques, NAC systems 180 provide multiple points of presence or NAC clouds at several geographic regions. NMS 130 is configured to manage NAC configuration, including access policies for enterprise networks, and push the appropriate NAC configuration data or files to the respective NAC clouds 180A-180K. In this way, NAC systems 180 provide the same benefits as a centralized, cloud-based network access control service with lower latency and high availability.

NAC systems 180 provide a way of authenticating client devices 148 to access wireless networks 106, such as branch or campus enterprise networks. NAC systems 180 may each include or provide access to an Authentication, Authorization, and Accounting (AAA) server, e.g., a RADIUS server, to authenticate client devices 148 prior to providing access to the enterprise network via the NAS devices 108. In some examples, NAC systems 180 may enable certificate-based authentication of client devices or enable interaction with cloud directory services to authenticate the client devices.

NAC systems 180 may identify client devices 148 and provide client devices 148 with the appropriate authorizations or access policies based on their identities, e.g., by assigning the client devices to certain virtual local area networks (VLANs), applying certain access control lists (ACLs), directing the client devices to certain registration portals, or the like. NAC systems 180 may identify client devices 148 by analyzing network behavior of the client devices, referred to as fingerprinting. Identification of client devices may be performed based on media access control (MAC) addresses, DHCP options used to request IP addresses, link layer discovery protocol (LLDP) packets, user agent information, and/or device type and operating system information.

Client devices 148 may include multiple different categories of devices with respect to a given enterprise, such as trusted enterprise devices, bring-your-own-device (BYOD) devices, IoT devices, and guest devices. NAC system 180 may be configured to subject each of the different categories of devices to different types of tracking, different types of authorization, and different levels of access privileges. In some examples, after a client device gains access to the enterprise network, NAC systems 180 may monitor activities of the client device to identify security concerns and, in response, re-assign the client device to a quarantine VLAN or another less privileged VLAN to restrict access of the client device.

NMS 130 is configured to operate according to an artificial intelligence/machine-learning-based computing platform providing comprehensive automation, insight, and assurance (WiFi Assurance, Wired Assurance and WAN assurance) spanning from "client," e.g., client devices 148 connected to wireless networks 106 and wired local area networks (LANs) at sites 102 to "cloud," e.g., cloud-based application services that may be hosted by computing resources within one or more data centers.

As described herein, NMS 130 provides an integrated suite of management tools and implements various techniques of this disclosure. In general, NMS 130 may provide a cloud-based platform for wireless network data acquisition, monitoring, activity logging, reporting, predictive analytics, network anomaly identification, and alert generation. For example, NMS 130 may be configured to proactively monitor and adaptively configure network 100 to provide self-driving capabilities. NMS 130 may be implemented by computing resources located at a physically distinct location relative to that of the physical devices of sites 102, and/or may be implemented by computing resources located in a different network or autonomous system from that of sites 102.

In some examples, AI-driven NMS 130 also provides configuration management, monitoring and automated oversight of software defined wide-area networks (SD-WANs), which operate as an intermediate network communicatively coupling wireless networks 106 and wired LANs at sites 102 to data centers and application services. In general, SD-WANs provide seamless, secure, traffic-engineered connectivity between "spoke" routers (e.g., routers 147) of the wired LANs hosting wireless networks 106, such as branch or campus enterprise networks, to "hub" routers further up the cloud stack toward the cloud-based application services. SD-WANs often operate and manage an overlay network on an underlying physical Wide-Area Network (WAN), which provides connectivity to geographically separate customer networks. In other words, SD-WANs extend Software-Defined Networking (SDN) capabilities to a WAN and allow network(s) to decouple underlying physical network infrastructure from virtualized network infrastructure and applications such that the networks may be configured and managed in a flexible and scalable manner.

In some examples, AI-driven NMS 130 may enable intent-based configuration and management of network system 100, including enabling construction, presentation, and execution of intent-driven workflows for configuring and managing devices associated with wireless networks 106, wired LAN networks, and/or SD-WANs. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient. Further example details and techniques of an intent-based network management system are described in U.S. Pat. No. 10,756,983, entitled "Intent-based Analytics," and U.S. Pat. No. 10,992,543, entitled "Automatically generating an intent-based network model of an existing computer network," each of which is hereby incorporated by reference.

Although the techniques of the present disclosure are described in this example as performed by NAC systems 180 and/or NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NAC systems 180 or NMS 130, or may be distributed throughout network 100, and may or may not form a part of NAC systems 180 or NMS 130.

Figure 1B:
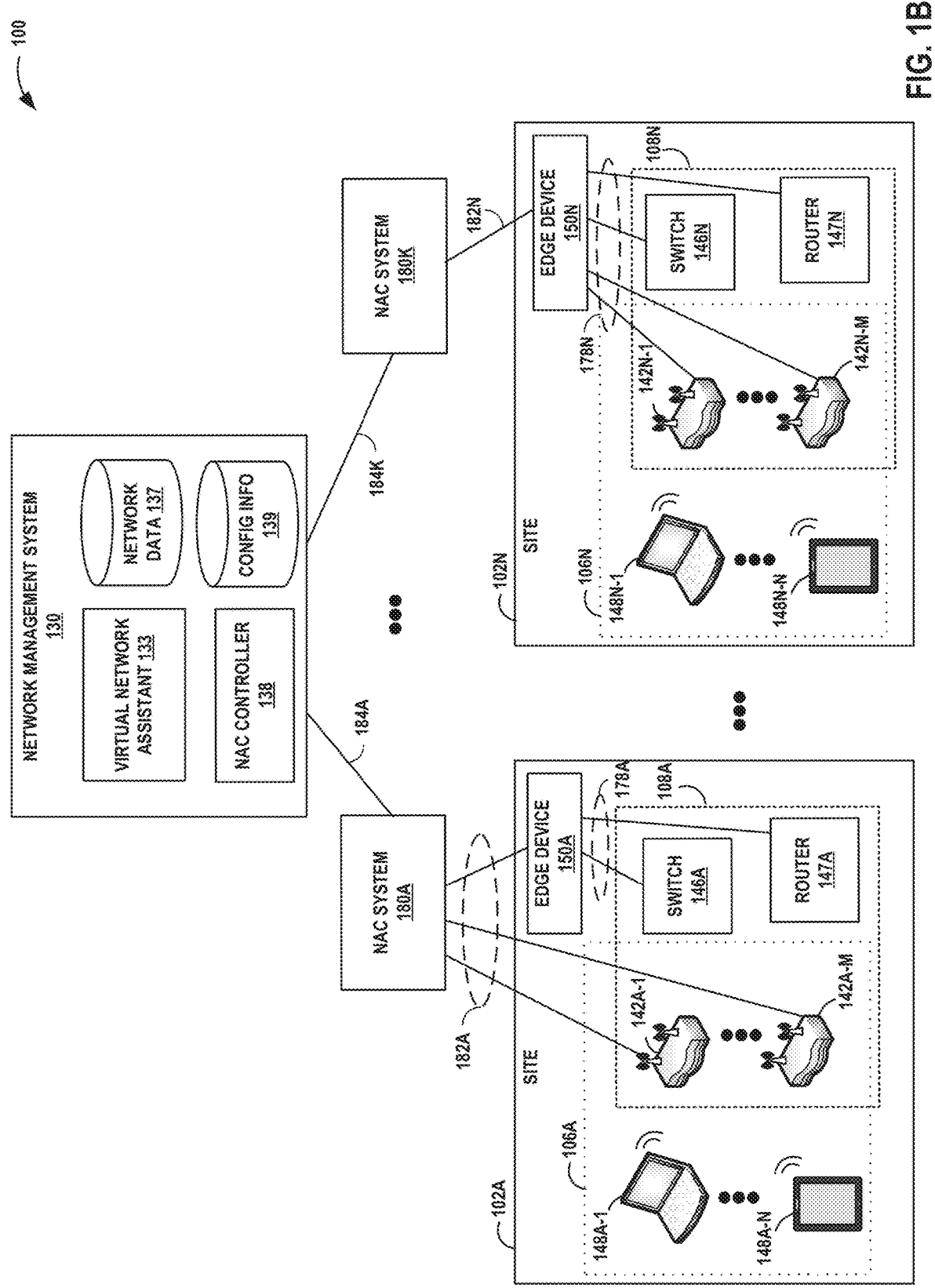
FIG. 1B is a block diagram illustrating further example details of the network system of FIG. 1A.

FIG. 1B is a block diagram illustrating further example details of the network system of FIG. 1A. In this example, FIG. 1B illustrates logical connections 178A-178N, 182A-182N, and 184A-184K, between NAS devices 108 at sites 102, NAC systems 180, and NMS 130. In addition, FIG. 1B illustrates NMS 130 configured to operate according to an AI-based computing platform to provide configuration and management of one or more of NAC systems 180 and NAS devices 108 at sites 102 via the logical connections.

In operation, NMS 130 observes, collects and/or receives network data 137, which may take the form of data extracted from messages, counters, and statistics, for example, from one or more of APs 142, switches 146, routers 147, edge devices 150, NAC systems 180, and/or other nodes within network 134. NMS 130 provides a management plane for network 100, including management of organization-specific configuration information 139 for one or more of NAS devices 108 at sites 102 and NAC systems 180. Each of the one or more NAS devices 108 and each of NAC systems 180 may have a secure connection with NMS 130, e.g., a RadSec (RADIUS over Transport Layer Security (TLS)) tunnel or another encrypted tunnel. Each of the NAS devices 108 and NAC systems 180 may download the appropriate organization-specific configuration information 139 from NMS 130 and enforce the configuration. In some scenarios, one or more of the NAS devices 108 may be a third-party device or otherwise not support establishment of a secure connection directly with NMS 130. In these scenarios, edge devices 150 may provide proxies through which the NAS devices 108 may connect to NMS 130.

In accordance with one specific implementation, a computing device is part of NMS 130. In accordance with other implementations, NMS 130 may comprise one or more computing devices, dedicated servers, virtual machines, containers, services, or other forms of environments for performing the techniques described herein. Similarly, computational resources and components implementing VNA 133 may be part of the NMS 130, may execute on other servers or execution environments, or may be distributed to nodes within network 134 (e.g., routers, switches, controllers, gateways, and the like).

In some examples, NMS 130 monitors network data 137, e.g., one or more service level expectation (SLE) metrics, received from each site 102A-102N, and manages network resources, such as the one or more of APs 142, switches 146, routers 147, and edge devices 150 at each site, to deliver a high-quality wireless experience to end users, IoT devices and clients at the site. In other examples, NMS 130 monitors network data 137 received from NAC systems 180 and manages organization-specific configuration information 139 for NAC systems 180 to enable unconstrained network access control services for client devices 148 at sites 102 with low latency and high availability.

As illustrated in FIG. 1B, NMS 130 may include a virtual network assistant (VNA) 133 that implements an event processing platform for providing real-time insights and simplified troubleshooting for IT operations, and that automatically takes corrective action or provides recommendations to proactively address network issues. VNA 133 may, for example, include an event processing platform configured to process hundreds or thousands of concurrent streams of network data 137 from sensors and/or agents associated with APs 142, switches 146, routers 147, edge devices 150, NAC systems 180, and/or other nodes within network 134. For example, VNA 133 of NMS 130 may include an underlying analytics and network error identification engine and alerting system in accordance with various examples described herein. The underlying analytics engine of VNA 133 may apply historical data and models to the inbound event streams to compute assertions, such as identified anomalies or predicted occurrences of events constituting network error conditions. Further, VNA 133 may provide real-time alerting and reporting to notify a site or network administrator via admin device 111 of any predicted events, anomalies, trends, and may perform root cause analysis and automated or assisted error remediation. In some examples, VNA 133 of NMS 130 may apply machine learning techniques to identify the root cause of error conditions detected or predicted from the streams of network data 137. If the root cause may be automatically resolved, VNA 133 may invoke one or more corrective actions to correct the root cause of the error condition, thus automatically improving the underlying SLE metrics and also automatically improving the user experience.

Further example details of operations implemented by the VNA 133 of NMS 130 are described in U.S. Pat. No. 9,832,082, issued Nov. 28, 2017, and entitled "Monitoring Wireless Access Point Events," U.S. Publication No. US 2021/0306201, published Sep. 30, 2021, and entitled "Network System Fault Resolution Using a Machine Learning Model," U.S. Pat. No. 10,985,969, issued Apr. 20, 2021, and entitled "Systems and Methods for a Virtual Network Assistant," U.S. Pat. No. 10,958,585, issued Mar. 23, 2021, and entitled "Methods and Apparatus for Facilitating Fault Detection and/or Predictive Fault Detection," U.S. Pat. No. 10,958,537, issued Mar. 23, 2021, and entitled "Method for Spatio-Temporal Modeling," and U.S. Pat. No. 10,862,742, issued Dec. 8, 2020, and entitled "Method for Conveying AP Error Codes Over BLE Advertisements," all of which are incorporated herein by reference in their entirety.

In addition, as illustrated in FIG. 1B, NMS 130 may include a NAC controller 138 that implements a NAC configuration platform that provides a user interface to create and assign access policies for client devices 148 of enterprise networks 106, and provides the appropriate organization-specific configuration information 139 to the respective NAC systems 180A-180K. NMS 130 may have a secure connection 184A-184K, e.g., a RadSec tunnel or another encrypted tunnel, with each of NAC systems 180A-180K, respectively. Through secure connections 184, NAC controller 136 may receive network data 137, e.g., NAC event data, from each of NAC systems 180 and each of NAC systems 180 may download the appropriate configuration information 139 from NMS 130. In some examples, NAC controller 138 may log or map which enterprise networks are served by which of NAC systems 180. In addition, NAC controller 138 may monitor NAC systems 180 to identify failures of primary NAC systems and manage failovers to standby NAC systems.

NAC systems 180 provide network access control services in a control plane for one or more of NAS devices 108 at sites 102. In operation, NAC systems 180 authenticate client devices 148 to access enterprise wireless networks 106 and may perform fingerprinting to identify the client devices 148 and apply authorizations or access polices to the client devices 148 based on the identities. NAC systems 180 include multiple, geographically distributed points of presence. For example, NAC system 180A may comprise a first cloud-based system positioned within a first geographic region, e.g., U.S. East, NAC system 180B (not shown) may comprise a second cloud-based system positioned within a second geographic region, e.g., U.S. West, and NAC system 180K may comprise a $k^{th}$ cloud-based system positioned within a $k^{th}$ geographic region, e.g., China.

Deploying multiple NAC clouds at several geographic regions enables network access control services to be offered to nearby NAS devices with lower latency and high availability, while avoiding the processing limitations and maintenance issues experienced by on-premises NAC appliances. For example, NAS devices 108A within enterprise network site 102A may connect to the physically closest one of NAC systems, i.e., NAC system 180A, to experience lower latency for network access control services. In some examples, the physically closest one of NAC systems 180 may comprise a primary NAC system, and the NAS devices may also connect to a next closest one of NAC systems 180 as a standby NAC system in case of a failure of the primary NAC system. For example, NAS devices 108A within enterprise network site 102A may connect to both NAC system 180A and NAC system 108B (not shown), to experience high availability of network access control services.

In the example illustrated in FIG. 1B, each of the NAS devices 108, directly or indirectly, has a secure connection with at least one of NAC systems 180. For example, each of APs 142A within site 120A has a direct, secure connection 182A to NAC system 180A, a RadSec tunnel or another encrypted tunnel. Each of switch 146A and router 147A within site 120A has an indirect connection to NAC system 180A via edge device 150A. In this example, switch 146A and router 147A may not support establishment of a secure connection directly with NAC system 180A, but edge device 150A may provide a proxy through which switch 146A and router 147A may connect to NAC system 180A. For example, each of switch 146A and router 147A have a direct connection 178A, e.g., a RADIUS tunnel, to edge device 151A, and edge device 150A has a direct, secure connection 182A to NAC system 180A. Similarly, for site 102N, each of NAS devices 108N has an indirect connection to NAC system 180K via edge device 150N. In this example, APs 142N, switch 142N, and router 147N may not support establishment of a secure connection directly with NAC system 180K, but edge device 150N may provide a proxy through which NAS devices 108N may connect to NAC system 180K. For example, each of APs 142N, switch 146N, and router 147N have a direct connection 178N, e.g., a RADIUS tunnel, to edge device 150N, and edge device 150N has a direct, secure connection 182N to NAC system 180K.

Through secure connections 182, NAC systems 180 may receive network access requests from client devices 148 through NAS devices 108 (and in some cases edge devices 150) at nearby enterprise sites 102. In response to the network access requests, NAC systems 180 authenticate the requesting client devices using an AAA server. NAC system 180 may perform fingerprinting to identify the authenticated client devices. NAC systems 180 then enforce the appropriate access policies on the identities of the authenticated client devices per the organization-specific configuration information 139 downloaded from NMS 130. In accordance with one specific implementation, a computing device is part of each of NAC systems 180. In accordance with other implementations, each of NAC systems 180A-180K may comprise one or more computing devices, dedicated servers, virtual machines, containers, services, or other forms of environments for performing the techniques described, herein.

In accordance with one or more techniques of this disclosure, NMS 130 and NAC systems 180 enable configuration and application of intent-based NAC policies for authentication and authorization of multi-tenant, NAS devices 108 to access enterprise networks 106 of organizations. In accordance with the disclosed techniques, NAC controller 138 of NMS 130 provides a user interface that enables configuration of intent-based NAC policies for an organization based on user input indicative of network administrator intent. In some examples, organization-specific configuration information 139 may include the intent-based NAC policies for one or more of the organizations. A NAC system, e.g., NAC system 180A, providing NAC services for the organization may apply an appropriate intent-based NAC policy of the one or more intent-based NAC policies in response to receipt of an authentication request to access an enterprise network of the organization, e.g., wireless network 106A at site 102A, from a NAS device, e.g., any of NAS devices 108A at site 102A.

The NAC system 180A automatically identifies a vendor of the NAS device 108A based on the authentication request and also identifies a device type (AP, switch, WLC, firewall, router, etc.) of the NAS device 108A. The NAC system 180A matches incoming attributes in the authentication request to a set of normalized match rules of the intent-based NAC policy and translates a set of abstracted policy results corresponding to the set of normalized match rules in the intent-based NAC policy into a vendor-specific set of return attributes based on the vendor and the device type of the NAS device 108A. The NAC system 180A then sends the vendor-specific set of return attributes to the NAS device 108A to enable the NAS device 108A to access the enterprise network 106A of the organization.

Traditionally, NAC authentication and authorization policy configuration is a very complex process that requires in-depth knowledge of a particular NAC product by a network administrator for the organization, as well as in-depth understanding of particular AAA protocols, e.g., RADIUS. This complexity exponentially grows with every additional NAS vendor added to the enterprise network, as the network administrator needs to know exactly what type of attributes are used by the particular NAS vendor and device type. This complexity generally results in the network administrator creating unique policy rules and sets of return attributes for each and every NAS vendor and device type, making overall policy management operationally challenging.

Existing solutions have been rather rudimentary, normalizing or simplifying only specific authentication flows. In addition, the existing solutions' configuration paradigms rely on separate policies for authentication and authorization rules, largely relying on matching specific RADIUS or directory attributes, requiring in-depth engineering knowledge from the network administrator. Moreover, for each policy configuration, the network administrator needs to switch between different sections or screens of a user interface platform to create even a simple policy set.

The techniques of this disclosure provide one or more technical advantages and practical applications. For example, the disclosed techniques enable creation of NAC policies based on network administrator intent (e.g., who can authenticate to the network, what kind of policies will be applied based on user or device identity and their state, etc.). An intent-based NAC policy comprises a set of normalized match rules with a corresponding set of abstracted policy results that are vendor-agnostic. In some examples, the set of normalized match rules of the intent-based NAC policy includes both authentication rules and authorization rules normalized to be vendor-agnostic. In this way, the disclosed techniques may merge or collapse multiple configuration phases, i.e., authentication policy configuration and authorization policy configuration, into a single configuration phase. The intent-based NAC policy configuration disclosed herein hides the configuration complexity associated with traditional NAC systems from administrators and other end-users, and dramatically improves operational experience when managing NAC systems.

Furthermore, the disclosed techniques enable dynamic vendor learning such that a NAC system, e.g., NAC system 180A, may automatically identify vendors of NAS devices 108 based on the authentication requests received from the NAS devices 108 and vendor signatures. The NAC system 180A may automatically configure a first vendor-specific set of return attributes from the intent-based NAC policy based on a first vendor identified for a first NAS device, e.g., AP 142A-1, requesting network access. The NAC system 180A may also automatically configure a second vendor-specific set of return attributes from the same intent-based. NAC policy based on a second vendor identified for a second NAS device, e.g., switch 146A, requesting network access. The disclosed techniques dramatically simplify, overall NAC policy configuration and operations, especially in large scaled, multi-vendor networks. The techniques also reduce the requirement on the network administrators such that that in-depth AAA or NAC product knowledge is not required.

Figure 2:
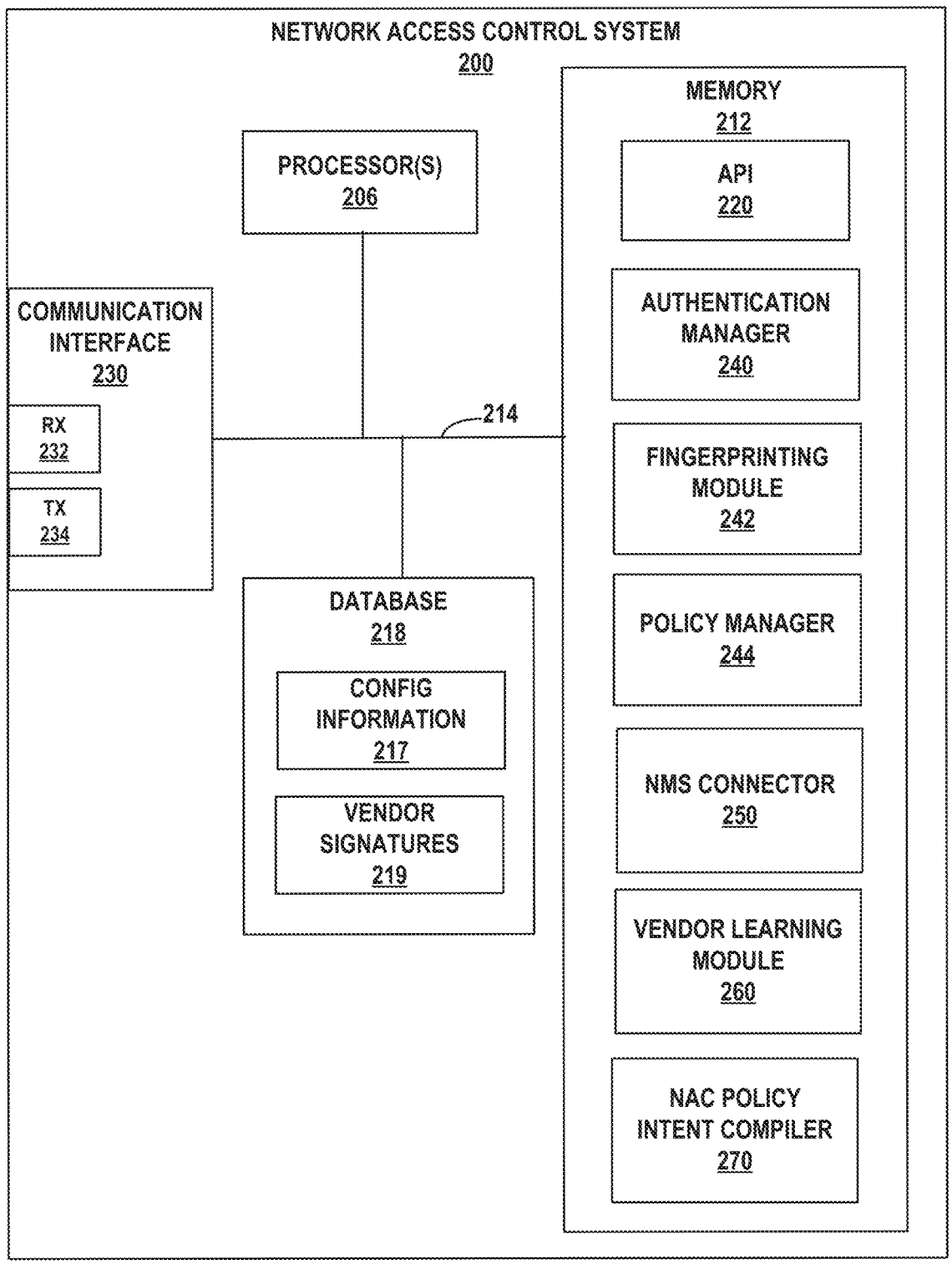
FIG. 2 is a block diagram of an example network access control system, in accordance with one or more techniques of this disclosure.

FIG. 2 is a block diagram of an example network access control (NAC) system 200, in accordance with one or more techniques of the disclosure. NAC system 200 may be used to implement, for example, any of NAC systems 180 in FIGS. 1A, 1B. In such examples, NAC system 200 is responsible for authenticating and authorizing one or more client devices 148 to access enterprise wireless networks 106 at a sub-set of nearby enterprise sites 102A-102N.

NAC system 200 includes a communications interface 230, one or more processor(s) 206, a user interface 210, a memory 212, and a database 218. The various elements are coupled together via a bus 214 over which the various elements may exchange data and information. In some examples, NAC system 200 receives network access requests from one or more of client devices 148 through NAS devices 108 (and in some cases edge devices 150) at the sub-set of nearby enterprise sites 102 from FIGS. 1A, 1B. In response to the network access requests, NAC system 200 authenticates the requesting client devices. In some examples, NAC system 200 enforces appropriate access policies on the authenticated client devices in accordance with organization-specific configuration information 217 downloaded from NMS 130 from FIGS. 1A, 1B. In some examples, NAC system 200 may be part of another server shown in FIGS. 1A, 1B or a part of any other server.

Processor(s) 206 execute software instructions, such as those used to define a software or computer program, stored to a computer-readable storage medium (such as memory 212), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 230 may include, for example, an Ethernet interface. Communications interface 230 couples NAC system 200 to a network and/or the Internet, such as any of network 134 as shown in FIG. 1A and/or any local area networks. Communications interface 230 includes a receiver 232 and a transmitter 234 by which NAC system 200 receives/transmits data and information to/from any of APs 142, switches 146, routers 147, edge devices 150, NMS 130, or servers 116, 122, 128 and/or any other network nodes, devices, or systems forming part of network system 100 such as shown in FIGS. 1A, 1B.

The data and information received by NAC system 200 may include, for example, configuration information 217 associated with one or more organizations or enterprise sites 102 that is downloaded from NMS 130. Configuration information 217 may include organization-specific NAC configuration information, including access policies and associated policy assignment criteria. For example, configuration information 217 may define certain virtual local area networks (VLANs), access control lists (ACLs), registration portals, or the like, associated with certain categories of client devices. Configuration information 217 may further define, for each of the different categories of the client devices, different types of tracking, different types of authorization, and/or different levels of access privileges. In accordance with the disclosed techniques, organization-specific configuration information 217 may include intent-based NAC policies for one or more of the organizations.

In addition, the data and information received by NAC system 200 may include identification information of client devices 148 from NAS devices 108 that is used by NAC system 200 to perform fingerprinting of the end user devices to enforce the access policies as defined in configuration information 217. NAC system 200 may further transmit data and information via communications interface 330 to NMS 130 including, for example, NAC event data, which may be used by NMS 130 to remotely monitor the performance of NAC system 200.

Memory 212 includes one or more devices configured to store programming modules and/or data associated with operation of NAC system 200. For example, memory 212 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 206 to perform the techniques described herein.

In this example, memory 212 includes an API 220, an authentication manager 240, a fingerprinting module 242, a policy manager 244, and an NMS connector 250. NAC system 200 may also include any other programmed modules, software engines and/or interfaces configured for authentication and authorization of client devices 148.

Authentication manager 240 enables authentication of client devices 148 at NAS devices 108 to access wireless networks 106, such as branch or campus enterprise networks, at the sub-set of enterprise sites 102 in communication with NAC system 200. Authentication manager 240 may perform the functionality of an AAA server, e.g., a RADIUS server, or provide access to an AAA server to authenticate client devices 148 prior to providing access to the enterprise networks 106 via the NAS devices 108. In some examples, authentication manager 240 may participate in a handshake exchange between a client device, an NAS device, and NAC system 200 controlling access at the NAS device. In other examples, authentication manager 240 may enable certificate-based authentication of client devices or enable interaction with cloud directory services to authenticate the client devices.

Fingerprinting module 242 enables identification of client devices 148 used to provide the client devices with appropriate authorizations or access policies based on their identities or categorizations. Fingerprinting module 242 may identify client devices 148 by analyzing network behavior of the client devices. Fingerprinting module 242 may receive the network behavior data of the client devices from the NAS devices 108 and/or edge devices 150 in communication with NAC system 200. For example, fingerprinting module 242 may perform fingerprinting of client devices 148 based on one or more of MAC addresses, DHCP options used to request IP addresses, LLDP packets, user agent information, and/or device type and operating system information.

Policy manager 244 enables enforcement of the authorizations or access policies based on the identities or categorizations of the authenticated client devices. For example, policy manager 244 may assign the authenticated client devices to certain VLANs, apply certain ACLs, direct the client devices to certain registration portals, or the like, that are each associated with different types of tracking, different types of authorization, and/or different levels of access privileges in accordance with configuration information 217 for the corresponding enterprise of the client devices. In some examples, after a client device gains access to the enterprise network, policy manger 244 may monitor activities of the client device to identify security concerns and, in response, re-assign the client device to a quarantine VLAN or another less privileged VLAN to restrict access of the client device.

NMS connector 250 manages the data and information exchanged between NAC system 200 and NMS 130, e.g., via a RadSec tunnel or another encrypted tunnel 184, as shown in FIG. 1B. NMS connector 250 may maintain a log or mapping of which enterprise networks are served by NAC system 200 and the corresponding configuration information 217 for those enterprises. NMS connector 250 may also manage any updates or modifications to configuration information 217 received from NMS 130.

In accordance with one or more techniques of this disclosure, NAC system 200 is configured to authenticate and authorize a NAS device to access an enterprise network of an organization by applying an appropriate intent-based NAC policy of the organization. NMS connector 250 of NAC system 200 obtains one or more intent-based NAC policies of one or more organizations from NMS 130. For example, NMS connector 250 may download configuration information 217 associated with an organization for which NAC system 200 is providing NAC services, the configuration information 217 may include intent-based NAC policies of the organization. In some examples, NMS connector 250 may perform a "lazy download" of configuration information 217, including the intent-based NAC policies, for the organization from NMS 130 in response to receipt of an authentication request for the enterprise network of the organization from a NAS device. The intent-based NAC policies of the organization may include one or more sets of normalized match rules with corresponding sets of abstracted policy results that are NAS vendor-agnostic. NMS connector 250 may periodically receive or otherwise obtain updates to the intent-based NAC policies of the organization from NMS 130.

In response to receipt of an authentication request for the enterprise network of the organization from a NAS device, vendor learning module 260 of NAC system 200 identifies a vendor of the NAS device based on the authentication request. For example, vendor teaming module 260 may match one or more features of the authentication request received from the NAS device to a vendor signature of the vendor of the NAS device included in vendor signatures 219 stored in database 218. In some examples, the one or more features of the authentication request may comprise one or more incoming attributes included in the authentication request. For example, the incoming attributes included in the authentication request may be vendor-specific AAA or RADIUS attributes. In other examples, the incoming attributes included in the authentication request may conform to a vendor-specific format or arrangement. NMS connector 250 may periodically receive or otherwise obtain updates to vendor signatures 219 from NMS 130.

NAC policy intent compiler 270 then translates the intent-based NAC policies included in configuration information 217 of the organization based on the identified vendor or the NAS device requesting access. In some examples, NAC system 200 also identifies a type of the NAS device (e.g., AP, switch, WLC, firewall, router, etc.). NAC policy intent compiler 270 then translates the intent-based NAC policies based on the vendor and the device type of the NAS device.

NAC policy intent compiler 270 matches one or more incoming attributes included in the authentication request from the NAS device to a set of normalized match rules of a particular intent-based NAC policy of the one or more intent-based NAC policies of the organization. For example, NAC policy intent compiler 270 may translate the one or more sets of normalized match rules of the one or more intent-based NAC policies of the organization into one or more vendor-specific sets of incoming attributes based on the vendor of the NAS device. NAC policy intent compiler 270 may then match the one or more incoming attributes included in the authentication request from the NAS device to a vendor-specific set of incoming attributes translated from the set of normalized match rules of the particular intent-based NAC policy. NAC policy intent compiler 270 also translates a set of abstracted policy results corresponding to the set of normalized match rules of the particular intent-based NAC policy into a vendor-specific set of return attributes based on the vendor of the NAS device.

The set of normalized match rules of the particular intent-based NAC policy may comprise both authentication rules and authorization rules normalized to be vendor-agnostic. For example, the set of normalized match rules of the particular intent-based. NAC policy may include authentication types, identity providers, e.g., user directory and/or certificate, and group names. In response to a match between the one or more incoming attributes included in the authentication request from the NAS device and the vendor-specific set of incoming attributes translated from the set of normalized match rules of the particular intent-based NAC policy, authentication manager 240 may operate as described above to authenticate the NAS device in accordance with the authentication match rules of the particular intent-based NAC policy. In addition, in response to the match and authentication of the NAS device, policy manager 244 may operate as described above to authorize the NAS device in accordance with the authorization match rules and the corresponding policy results of the particular intent-based NAC policy. The policy results may include VLANs and roles to which to assign the NAS device.

NAC system 200 sends the vendor-specific set of return attributes translated from the policy results of the particular intent-based NAC policy to the NAS device. The return attributes may include at least one vendor-specific attribute to specify a VLAN and/or role assigned to the NAS device to enable the NAS device to access the enterprise network of the organization with the appropriate level of access privileges.

Continuing the above example with the assumption that the identified vendor of the NAS device is a first vendor, in response to receipt of a second authentication request for the enterprise network of the organization from a second SAS device, vendor learning module 260 of NAC system 200 identifies a second vendor of the second NAS device based on the second authentication request. NAC policy intent compiler 270 matches one or more incoming attributes included in the second authentication request from the second NAS device to the set of normalized match rules in the same, particular intent-based NAC policy. NAC policy intent compiler 270 then translates the set of abstracted policy results corresponding to the set of normalized match rules of the particular intent-based NAC policy into a second vendor-specific set of return attributes based on the second vendor of the second NAS device. NAC system 200 send the second vendor-specific set of return attributes to the second NAS device to enable the second NAS device to access the enterprise network of the organization with the appropriate level of access privileges. The disclosed techniques dramatically simplify overall NAC policy configuration and dramatically improves operational experience when managing NAC systems, especially in large scaled, multi-vendor networks.

Figure 3:
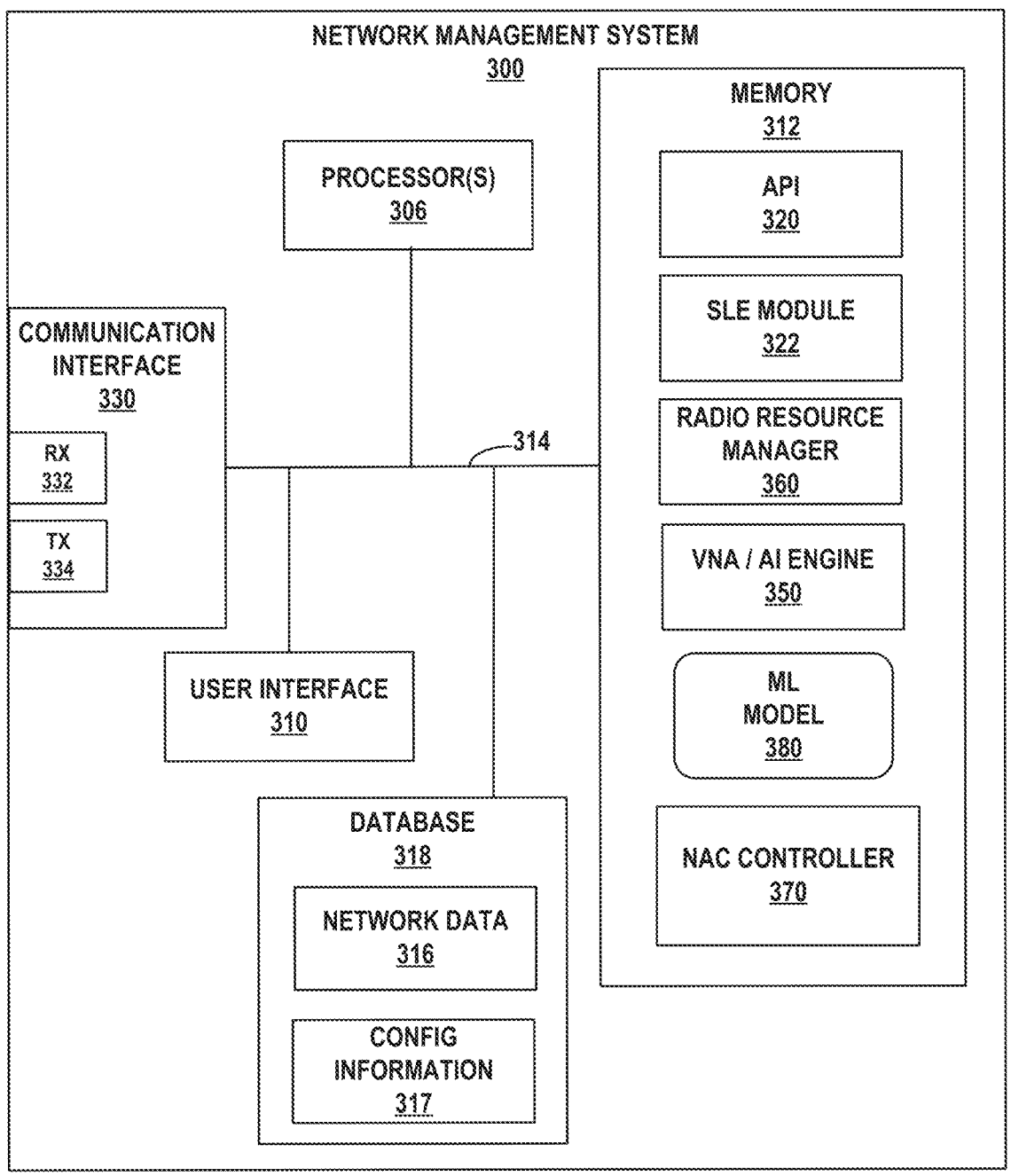
FIG. 3 is a block diagram of an example network management system, in accordance with one or more techniques of the disclosure.

FIG. 3 is a block diagram of an example network management system (NMS) 300, in accordance with one or more techniques of the disclosure. NMS 300 may be used to implement, for example, NMS 130 in FIGS. 1A, 1B. In such examples, NMS 300 is responsible for monitoring and management of one or more wireless networks 106A-106N at sites 102A-102N, respectively.

NMS 300 includes a communications interface 330, one or more processor(s) 306, a user interface 310, a memory 312, and a database 318. The various elements are coupled together via a bus 314 over which the various elements may exchange data and information. In some examples, NMS 300 receives data from one or more of client devices 148, APs 142, switches 146, routers, 147, edge devices 150, NAC systems 180, and other network nodes within network 134, e.g., routers and gateway devices, which may be used to calculate one or more SLE metrics and/or update network data 316 in database 318. NMS 300 analyzes this data for cloud-based management of wireless networks 106A-106N. In some examples, NMS 300 may be part of another server shown in FIG. 1A or a part of any other server.

Processor(s) 306 execute software instructions, such as those used to define a software or computer program, stored to a computer-readable storage medium (such as memory 312), such as non-transitory computer-readable mediums including a storage device (e.g., a disk drive, or an optical drive) or a memory (such as Flash memory or RAM) or any other type of volatile or non-volatile memory, that stores instructions to cause the one or more processors 306 to perform the techniques described herein.

Communications interface 330 may include, for example, an Ethernet interface. Communications interface 330 couples NMS 300 to a network and/or the Internet, such as any of network(s) 134 as shown in FIG. 1A, and/or any local area networks. Communications interface 330 includes a receiver 332 and a transmitter 334 by which NMS 300 receives/transmits data and information to/from any of client devices 148, APs 142, switches 146, routers 147, edge devices 150, NAC systems 180, servers 116, 122, 128 and/or any other network nodes, devices, or systems forming part of network system 100 such as shown in FIG. 1A. In some scenarios described herein in which network system 100 includes "third-party" network devices that are owned and/ or associated with different entities than NMS 300, NMS 300 does not directly receive, collect, or otherwise have access to network data from the third-party network devices. In some examples, an edge device, such as edge devices 150 from FIGS. 1A, 1B, may provide a proxy through which the network data of the third-party network devices may be reported to NMS 300.

The data and information received by NMS 300 may include, for example, telemetry data, SLE-related data, or event data received from one or more of client device APs 148, APs 142, switches 146, routers 147, edge devices 150, NAC systems 180, or other network nodes, e.g., routers and gateway devices, used by NMS 300 to remotely monitor the performance of wireless networks 106A-106N and application sessions from client device to cloud-based application server. NMS 300 may further transmit data via communications interface 330 to any of the network devices, such as client devices 148, APs 142, switches 146, routers 147, edge devices 150, NAC systems 180, or other network nodes within network 134, to remotely manage wireless networks 106A-106N and portions of the wired network.

Memory 312 includes one or more devices configured to store programming modules and/or data associated with operation of NMS 300. For example, memory 312 may include a computer-readable storage medium, such as a non-transitory computer-readable medium including a storage device (e.g., a disk drive, or an optical drive) or a memory (such as Flash memory or RAM) or any other type of volatile or non-volatile memory, that stores instructions to cause the one or more processor(s) 306 to perform the techniques described herein.

In this example, memory 312 includes an API 320, an SLE module 322, a virtual network assistant (VNA)/AI engine 350, a radio resource management (RRM) engine 360, and a NAC controller 370. NMS 300 may also include any other programmed modules, software engines and/or interfaces configured for remote monitoring and management of wireless networks 106A-106N and portions of the wired network, including remote monitoring and management of any of APs 142, switches 146, routers 147, edge devices 150, NAC systems 180, or other network devices, e.g., routers and gateway devices.

SLE module 322 enables set up and tracking of thresholds for SLE metrics for each network 106A-106N. SLE module 322 further analyzes SLE-related data collected by, e.g., APs, such as any of APs 142 from UEs in each wireless network 106A-106N. For example, APs 142A-1 through 142A-N collect SLE-related data from UEs 148A-1 through 148A-N currently connected to wireless network 106A. This data is transmitted to NMS 300, which executes by SLE module 322 to determine one or more SLE metrics for each UE 148A-1 through 148A-N currently connected to wireless network 106A. This data, in addition to any network data collected by one or more APs 142A-1 through 142A-N in wireless network 106A, is transmitted to NMS 300 and stored as, for example, network data 316 in database 318.

RRM engine 360 monitors one or more metrics for each site 102A-102N in order to learn and optimize the RF environment at each site. For example, RRM engine 360 may monitor the coverage and capacity SLE metrics for a wireless network 106 at a site 102 in order to identify potential issues with SLE coverage and/or capacity in the wireless network 106 and to make adjustments to the radio settings of the access points at each site to address the identified issues. For example, RRM engine may determine channel and transmit power distribution across all APs 142 in each network 106A-106N. For example, RRM engine 360 may monitor events, power, channel, bandwidth, and number of clients connected to each AP. RRM engine 360 may further automatically change or update configurations of one or more APs 142 at a site 102 with an aim to improve the coverage and capacity SLE metrics and thus to provide an improved wireless experience for the user.

VNA/AI engine 350 analyzes data received from network devices as well as its own data to identify when undesired to abnormal states are encountered at one of the network devices. For example, VNA/AI engine 350 may identify the root cause of any undesired or abnormal states, e.g., any poor SLE metric(s) indicative of connected issues at one or more network devices. In addition, VNA/AI engine 350 may automatically invoke one or more corrective actions intended to address the identified root cause(s) of one or more poor SLE metrics. In some examples, ML model 380 may comprise a supervised ML model that is trained, using training data comprising pre-collected, labeled network data received from the network devices. The supervised ML model may comprise one of a logistical regression, naïve Bayesian, support vector machine (SVM), or the like. In other examples, ML model 380 may comprise an unsupervised ML model. Although not shown in FIG. 3, in some examples, database 318 may store the training data and VNA/AI engine 350 or a dedicated training module may be configured to train ML model 380 based on the training data to determine appropriate weights across the one or more features of the training data.

Examples of corrective actions that may be automatically invoked by VNA/AI engine 350 may include, but are not limited to, invoking RRM 360 to reboot one or more APs, adjusting/modifying the transmit power of a specific radio in a specific AP, adding SSID configuration to a specific AP, changing channels on an AP or a set of APs, etc. The corrective actions may further include restarting a switch and/or a router, invoking downloading of new software to an AP, switch, or router, etc. These corrective actions are given for example purposes only, and the disclosure is not limited in this respect. If automatic corrective actions are not available or do not adequately resolve the root cause, VNA/AI engine 350 may proactively provide a notification including recommended corrective actions to be taken by IT personnel, e.g., a site or network administrator using admin device 111, to address the network error.

NAC controller 370 implements a NAC configuration platform that provides user interface 310 for display to an enterprise network administrator, e.g., via admin device 111 of FIG. 1A, through which to receive access policy information for the enterprise network. NAC controller 370 creates organization-specific configuration information 317 stored in database 318 based on the input received via user interface 310. Configuration information 317 may include NAC configuration information for each of one or more enterprise networks managed by NMS 300. For each enterprise, configuration information 317 may including access policies and associated policy assignment criteria. For example, configuration information 317 may define certain VLANs, ACLs, registration portals, or the like, associated with certain categories of client devices, and may further define, for each of the different categories of the client devices, different types of tracking, different types of authorization, and/or different levels of access privileges. In accordance with the disclosed techniques, organization-specific configuration information 317 may include intent-based NAC policies for one or more of the organizations. Configuration information 317 may be substantially similar to configuration information 139 of FIG. 1B.

NAC controller 370 manages the data and information exchanged between NMS 300 and NAC systems 180, e.g., via RadSec tunnels or another encrypted tunnels 184, as shown in FIG. 1B. NAC controller 370 may maintain a log or mapping of which enterprise networks are served by which of NAC systems 180 and the corresponding configuration information 317 for those enterprises. NAC controller 370 may also manage any updates or modifications to configuration information 317 to be pushed down to NAC systems 180. In addition, NAC controller 370 may monitor NAC systems 180 to identify failures of primary NAC systems and manage failovers to standby NAC systems.

In accordance with one or more techniques of this disclosure, NAC controller 370 is configured to provide user interface 310 to enable configuration of intent-based NAC policies for one or more organizations based on user input indicative of network administrator intent. The intent-based NAC policies of the one or more organizations may be included in configuration information 317 available for download or otherwise pushed down to NAC systems 180. The intent-based NAC policies may include one or more sets of normalized match rules with corresponding sets of abstracted policy results that are NAS vendor-agnostic. NAC controller 370 may periodically update the intent-based NAC policies included in configuration information 317.

To configure the intent-based NAC policies of an organization based on network administrator intent, NAC controller 370 may receive, from admin device 111 via user interface 310, data indicative of selection of one or more labels representative of authentication rules of the organization. The authentication rules may include authentication types and identity providers. NAC controller 370 may further receive, from admin device 111 via user interface 310, data indicative of selection of one or more labels representative of authorization rules of the organization. The authorization rules may include group names, VLANs, and roles. NAC controller 370 may then configure the one or more sets of normalized match rules of the one or more intent-based NAC policies of the organization based on the selected one or more labels representative of the authentication rules of the organization and the group names from the authorization rules of the organization. Furthermore, for each set of the one or more sets of normalized match rules, NAC controller 370 may configure a corresponding set of the one or more sets of abstracted policy results of the one or more intent-based NAC policies of the organization based on the selected one or more labels representative of the VLANs and roles from the authorization rules of the organization.

The intent-based NAC policy configuration provided by NAC controller 370 hides the configuration complexity associated with traditional NAC systems from administrators and other end-users, reducing the requirement on the network administrators such that that in-depth AAA or NAC product knowledge is not required.

For example, assume that a network administrator of an organization needs to create two policies to allow wireless users to authenticate using EAP-TLS and assign specific VLAN and Network Policy role based on the user group membership in the user directory, and further assume two user groups: employees and contractors. For this example, also assume that the organization has a multi-vendor wireless network from two different vendors.

An example traditional NAC policy configuration may look like the following:
1. Create authentication policy specifying authentication type (e.g., 802.1X with EAP-TLS), and point that authentication policy to lookup a particular user directory
2. Create authorization policy specifying which AAA attributes need to be sent back to the NAS for each user group, i.e., VLAN ID and Network Policy role.
3. Repeat the above two steps for each and every new vendor NAS, as both inbound and return attributes might not be the same across vendors.

Figure 6:
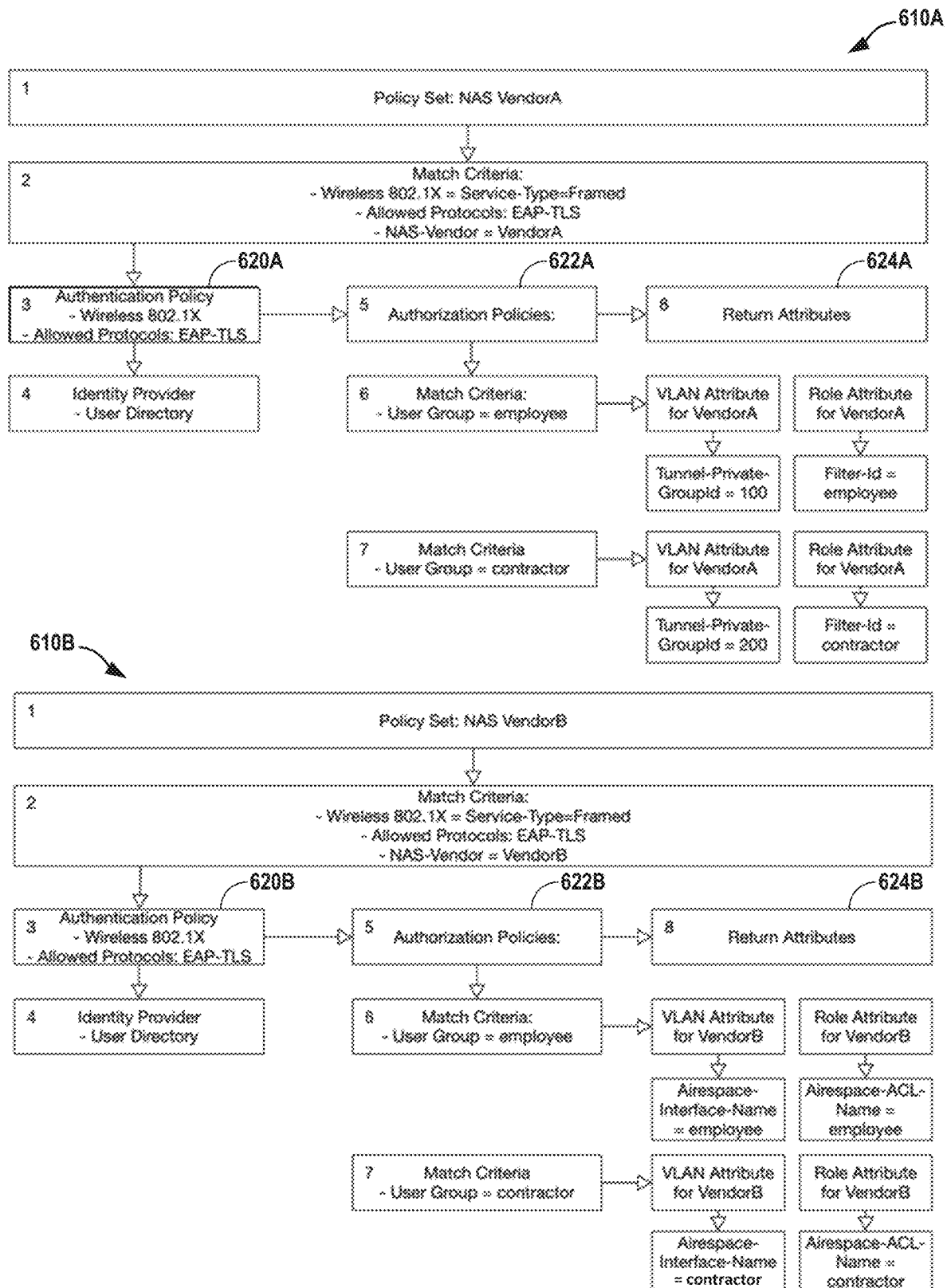
FIG. 6 is a conceptual diagram illustrating a typical NAC policy configuration process for two different NAS vendors.

FIG. 6 illustrates a more detailed depiction of the workflow for a typical NAC policy configuration process for two different NAS vendors.

The disclosed techniques provide a much more elegant and simplified configuration process, while maintaining flexibility and achieving the same network administrator intent. An example intent-based NAC policy configuration, in accordance with the disclosed techniques, may look like the following:

1. Authentication rules and authorization rules are abstracted from the admin. The disclosed techniques merge or collapse multiple configuration phases, i.e., authentication policy configuration and authorization policy configuration, into a single configuration phase.
2. Admin only selects match criteria and policy results via a user interface.
3. For both match criteria and policy results, the user interface provides reusable labels that only specify admin intent. In response to an authentication request from a NAS device, a NAC system translates the intent into sets of incoming or return attributes, based on the vendor and the device type of the NAS device.

Figure 7:
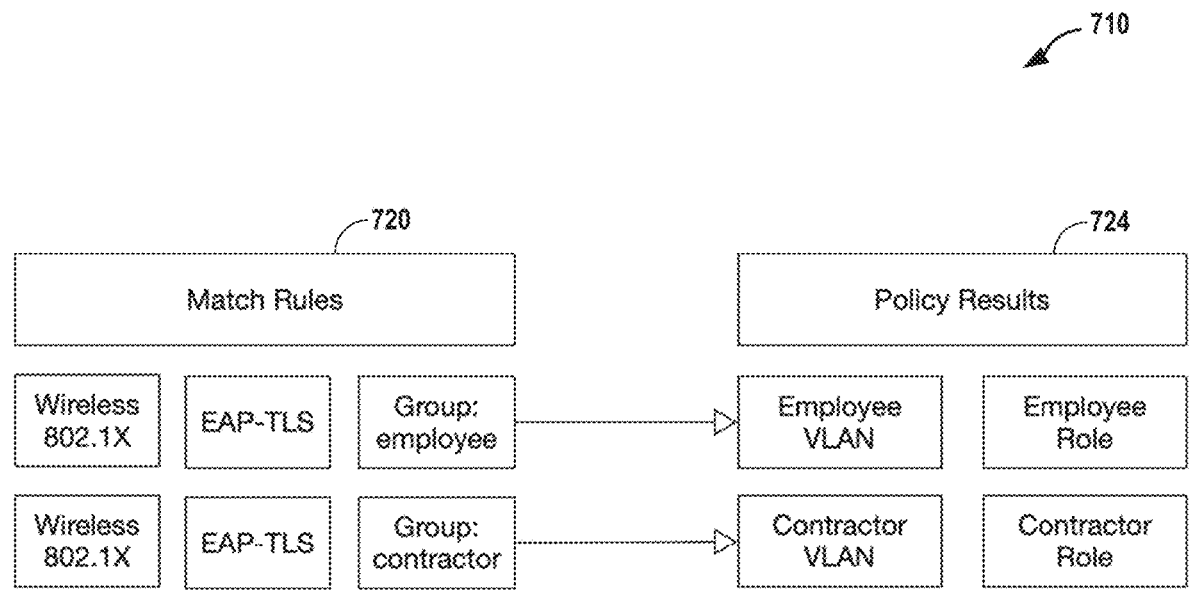
FIG. 7 is a conceptual diagram illustrating an intent-based NAC policy configuration process, in accordance with one or more techniques of this disclosure.

FIG. 7 illustrates a more detailed depiction of the workflow for the intent-based NAC policy configuration process disclosed herein.

Although the techniques of the present disclosure are described in this example as performed by NMS 130, techniques described herein may be performed by any other computing device(s), system(s), and/or server(s), and that the disclosure is not limited in this respect. For example, one or more computing device(s) configured to execute the functionality of the techniques of this disclosure may reside in a dedicated server or be included in any other server in addition to or other than NMS 130, or may be distributed throughout network 100, and may or may not form a part of NMS 130.

Figure 4:
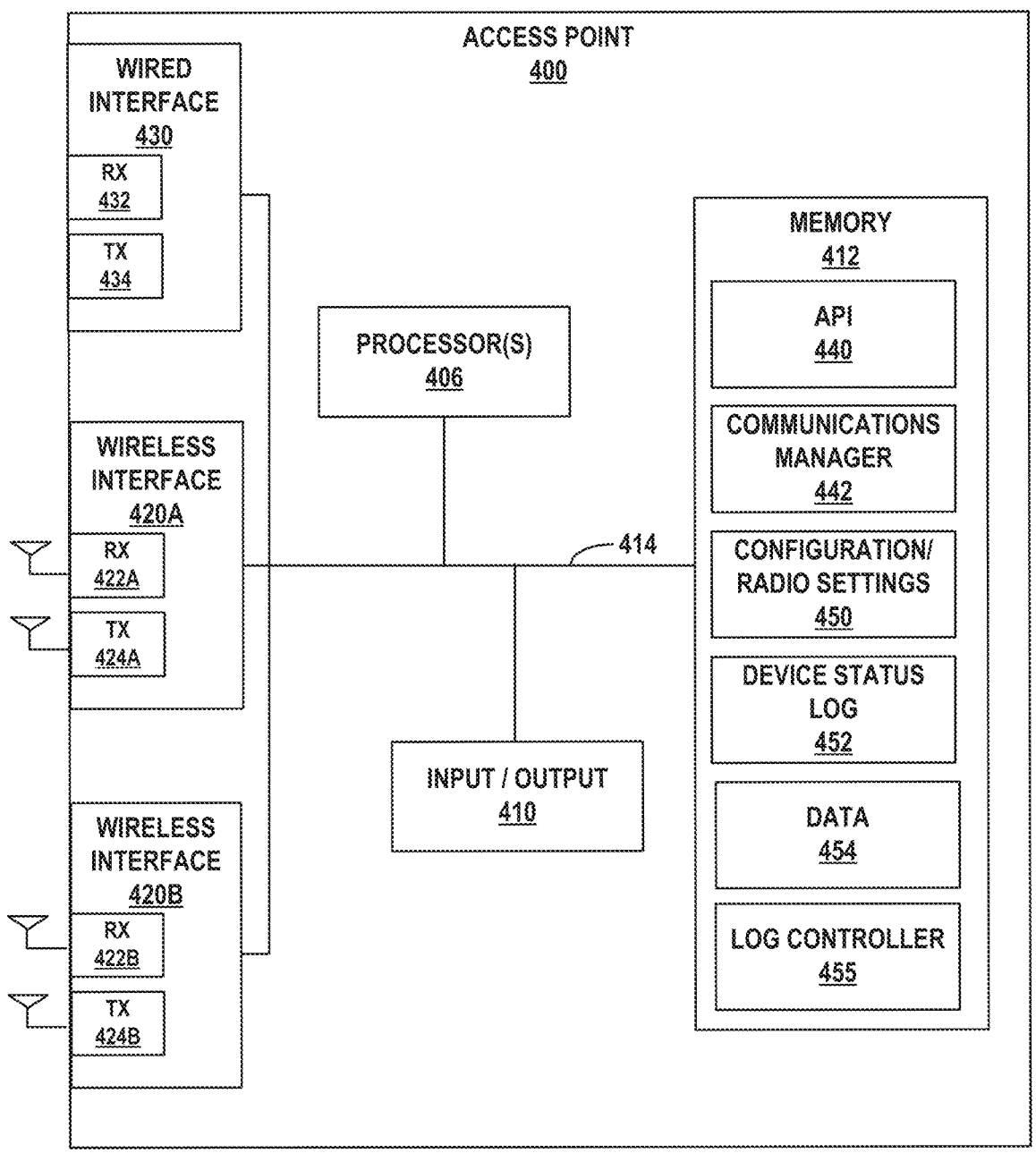
FIG. 4 is a block diagram of an example access point device, in accordance with one or more techniques of this disclosure.

FIG. 4 is a block diagram of an example access point (AP) device 400, in accordance with one or more techniques of this disclosure. Example access point 400 shown in FIG. 4 may be used to implement any of APs 142 as shown and described herein with respect to FIG. 1A, Access point 400 comprise, for example, a Wi-Fi, Bluetooth and/or Bluetooth Low Energy (BLE) base station or any other type of wireless access point.

In the example of FIG. 4, access point 400 includes a wired interface 430, wireless interfaces 420A-420B one or more processor(s) 406, memory 412, and input/output 410, coupled together via a bus 414 over which the various elements may exchange data and information. Wired interface 430 represents a physical network interface and includes a receiver 432 and a transmitter 434 for sending and receiving network communications, e.g., packets. Wired interface 430 couples, either directly or indirectly, access point 400 to a wired network device, such as one of switches 146 or routers 147 of FIGS. 1A, 1B, within the wired network via a cable, such as an Ethernet cable.

First and second wireless interfaces 420A and 420B represent wireless network interfaces and include receivers 422A and 422B, respectively, each including a receive antenna via which access point 400 may receive wireless signals from wireless communications devices, such as UEs 148 of FIGS. 1A, 1B. First and second wireless interfaces 420A and 420B further include transmitters 424A and 424B, respectively, each including transmit antennas via which access point 400 may transmit wireless signals to wireless communications devices, such as UEs 148 of FIGS. 1A, 1B. In some examples, first wireless interface 420A may include a Wi-Fi 802.11 interface (e.g., 2.4 GHz and/or 5 GHz) and second wireless interface 420B may include a Bluetooth interface and/or a Bluetooth Low Energy (BLE) interface. As described above, AP 400 may request network access for one or more UEs 148 from a nearby NAC system, e.g., NAC system 200 of FIG. 2 or one of NAC systems 180 of FIGS. 1A, 1B.

Processor(s) 406 are programmable hardware-based processors configured to execute software instructions, such as those used to define a software or computer program, stored to a computer-readable storage medium (such as memory 412), such as non-transitory computer-readable mediums including a storage device (e.g., a disk drive, or an optical drive) or a memory (such as Flash memory or RAM) or any other type of volatile or non-volatile memory, that stores instructions to cause the one or more processors 406 to perform the techniques described herein.

Memory 412 includes one or more devices configured to store programming modules and/or data associated with operation of access point 400. For example, memory 412 may include a computer-readable storage medium, such as non-transitory computer-readable mediums including a storage device (e.g., a disk drive, or an optical drive) or a memory (such as Hash memory or RAM) or any other type of volatile or non-volatile memory, that stores instructions to cause the one or more processor(s) 406 to perform the techniques described herein.

In this example, memory 412 stores executable software including an application programming interface (API) 440, a communications manager 442, configuration settings 450, a device status log 452, data storage 454, and log controller 455. Device status log 452 includes a list of events specific to access point 400. The events may include a log of both normal events and error events such as, for example, memory status, reboot or restart events, crash events, cloud disconnect with self-recovery events, low link speed or link speed flapping events, Ethernet port status, Ethernet interface packet errors, upgrade failure events, firmware upgrade events, configuration changes, etc., as well as a time and date stamp for each event. Log controller 455 determines a logging level for the device based on instructions from NMS 130. Data 454 may store any data used and/or generated by access point 400, including data collected from UEs 148, such as data used to calculate one or more SLE metrics, that is transmitted by access point 400 for cloud-based management of wireless networks 106A by NMS 130/300.

Input/output (I/O) 410 represents physical hardware components that enable interaction with a user, such as buttons, a display, and the like. Although not shown, memory 412 typically stores executable software for controlling a user interface with respect to input received via I/O 410. Communications manager 442 includes program code that, when executed by processor(s) 406, allow access point 400 to communicate with UEs 148 and/or network(s) 134 via any of interface(s) 430 and/or 420A-420C. Configuration settings 450 include any device settings for access point 400 such as radio settings for each of wireless interface(s) 420A-420C. These settings may be configured manually or may be remotely monitored and managed by NMS 130 to optimize wireless network performance on a periodic (e.g., hourly or daily) basis.

As described herein, AP device 400 may measure and report network data from status log 452 to NMS 130. The network data may comprise event data, telemetry data, and/or other SLE-related data. The network data may include various parameters indicative of the performance anchor status of the wireless network. The parameters may be measured and/or determined by one or more of the UE devices and/or by one or more of the APs in a wireless network. NMS 130/300 may determine one or more SLE metrics based on the SLE-related data received from the APs in the wireless network and store the SLE metrics as network data 137 (FIG. 1B).

Figure 5:
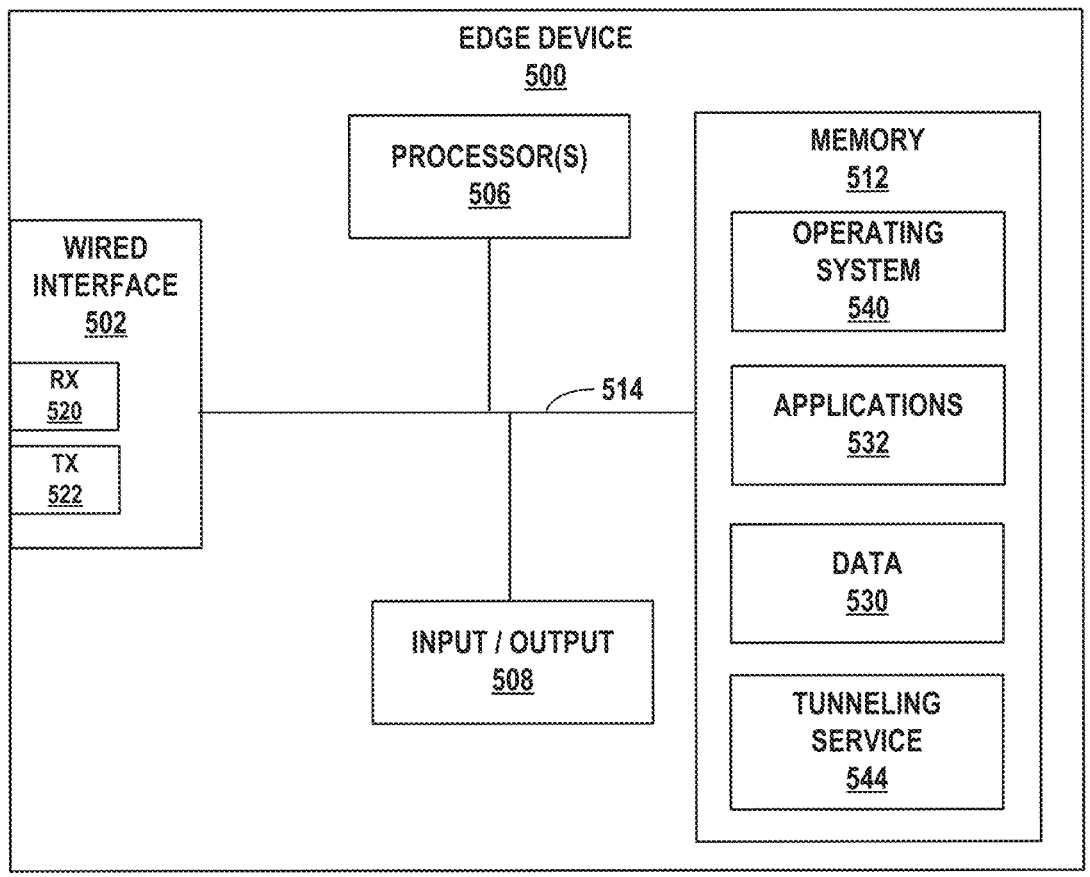
FIG. 5 is a block diagram of an example edge device, in accordance with one or more techniques of this disclosure.

FIG. 5 is a block diagram illustrating an example edge device 500, in accordance with one or more techniques of this disclosure. Edge device 500 comprises a cloud-managed, wireless local area network (LAN) controller. Edge device 500 may be used to implement, for example, any of edge devices 150 in FIGS. 1A, 1B. In such examples, edge device 500 comprises an on-premises device at a site 102 that is in communication with NMS 130 and one or more on-premises NAS devices 108, e.g., one or more APs 142, switches 146, or routers 147, from FIGS. 1A, 1B. Edge device 500 with NMS 130 and may operate to extend certain microservices from NMS 130 to the on-premises NAS devices 108 while using NMS 130 and its distributed software architecture for scalable and resilient operations, management, troubleshooting, and analytics.

In this example, edge device 500 includes a wired interface 502, e.g., an Ethernet interface, a processor 506, input/output 508, e.g., display, buttons, keyboard, keypad, touch screen, mouse, etc., and a memory 512 coupled together via a bus 514 over which the various elements may interchange data and information. Wired interface 502 couples edge device 500 to a network, such as network 134 shown in FIG. 1A and/or any local area networks. Wired interface 502 includes a receiver 520 and a transmitter 522 by which edge device 500 receives/transmits data and information to/from any of NAS devices 108 and NMS 130 and/or NAC systems 180. Though only one interface is shown by way of example, edge device 500 may have multiple communication interfaces and/or multiple communication interface ports.

Memory 512 stores executable software applications 532, operating system 540 and data/information 530. Data 530 may include a system log and/or an error log that stores event data, including behavior data, for edge device 500. Tunneling service 544 provides on-premises tunnel termination from APs and other NAS devices. Tunneling service 544 further provides a secure tunnel proxy to NMS 130 and/or NAC systems 180. In one scenario, one or more of the NAS devices 108, e.g., switch 146A from FIG. 1B, may not support establishment of RadSec tunnels directly with NMS 130 and/or NAC systems 180. In this scenario, tunneling service 544 of edge device 500 provides a RadSec proxy to enable RADIUS packets received from switch 146A via a RADIUS tunnel 178A to be tunneled to NAC system 180A using a RadSec tunnel 182A, as shown in FIG. 1B.

FIG. 6 is a conceptual diagram illustrating a typical NAC policy configuration process for two different NAS vendors. More specifically, FIG. 6 illustrates a NAC policy configuration process 610A for NAS Vendor A and a NAC policy configuration process 610B for NAS Vendor B.

In process 610A, an administrator: (1) defines a policy set for NAS Vendor A, (2) specifies authentication match criteria of the authentication type, authentication protocol, and NAS vendor, (3) defines an authentication policy 620A based on the authentication match criteria and (4) specifies an identity provider, (5) defines authorization policies 622A including (6) specifying a first authorization match criteria of a user group=employee and (7) specifying a second authorization match criteria of a user group=contractor, and (8) defines vendor-specific return attributes 624A for each of the authorization policies. For example, in process 610A, for the first authorization match criteria of a user group=employee, the administrator defines a VLAN attributes for Vendor A as Tunnel-Private-GroupId=100 and a Role attribute for Vendor A as Filter-Id=employee. As another example, in process 610A, for the second authorization match criteria of a user group=contractor, the administrator defines a VLAN attributes for Vendor A as Tunnel-Private-GroupId=200 and a Role attribute for Vendor A as Filter-Id=contractor.

In process 610B, the administrator: (1) defines a policy set for NAS Vendor B, (2) specifies authentication match criteria of the authentication type, authentication protocol, and NAS vendor, (3) defines an authentication policy 620B based on the authentication match criteria and (4) specifies an identity provider, (5) defines authorization policies 622B including (6) specifying a first authorization match criteria of a user group=employee and (7) specifying a second authorization match criteria of a user group=contractor, and (8) defines vendor-specific return attributes 624A for each of the authorization policies. For example, in process 610B, for the first authorization match criteria of a user group=employee, the administrator defines a WAN attributes for Vendor B as Airespace-interface-Name=employee and a Role attribute for Vendor B as Airespace-ACL-Name=employee. As another example, in process 610B, for the second authorization match criteria of a user group=contractor, the administrator defines a ULAN attributes for Vendor B as Airespace-Interface-Name=contractor and a Role attribute for Vendor B as Airespace-ACL-Name=contractor.

FIG. 7 is a conceptual diagram illustrating an intent-based NAC policy configuration process, in accordance with one or more techniques of this disclosure. More specifically, FIG. 7 illustrates an intent-based NAC policy configuration process 710 that is vendor-agnostic.

In process 710, an administrator selects match rules 720 including authentication match rules, e.g., authentication type and authentication protocol, and authorization match rules, e.g., user group names. In the illustrated example, match rules 720 include a first set of match rules that includes authentication type, authentication protocol, and group: employee, and a second set of match rules authentication type, authentication protocol, and group: contractor. In process 710, for each set of match rules, the administrator selects policy results 724 including VLANs and Network Policy roles. In the illustrated example, policy results 724 include a first set of policy results corresponding to the first set of match rules that includes Employee VLAN and Employee Role, and a second set of policy results corresponding to the second set of match rules that includes Contractor VLAN and Contractor Role.

In some examples, the administrator may select match rules 720 and corresponding policy results 724 using labels that are pre-defined or created via the user interface provided by NMS 130/300. NMS 130/300 normalizes match rules 720 across different NAS vendors and different NAS device types. NAC systems 180/200 may automatically select the identity provider or user director based on an incoming authentication user realm, e.g., a domain name, of a NAS device requesting authentication. NMS 130/300 abstracts policy results 724 such that the admin only needs to select the VLAN ID/Name or Role name via the user interface. NAC systems 180/200 automatically substitute policy results 724 with a vendor-specific set of return attributes based on the NAS vendor and the NAS device type of the NAS device requesting authentication.

Figure 8:
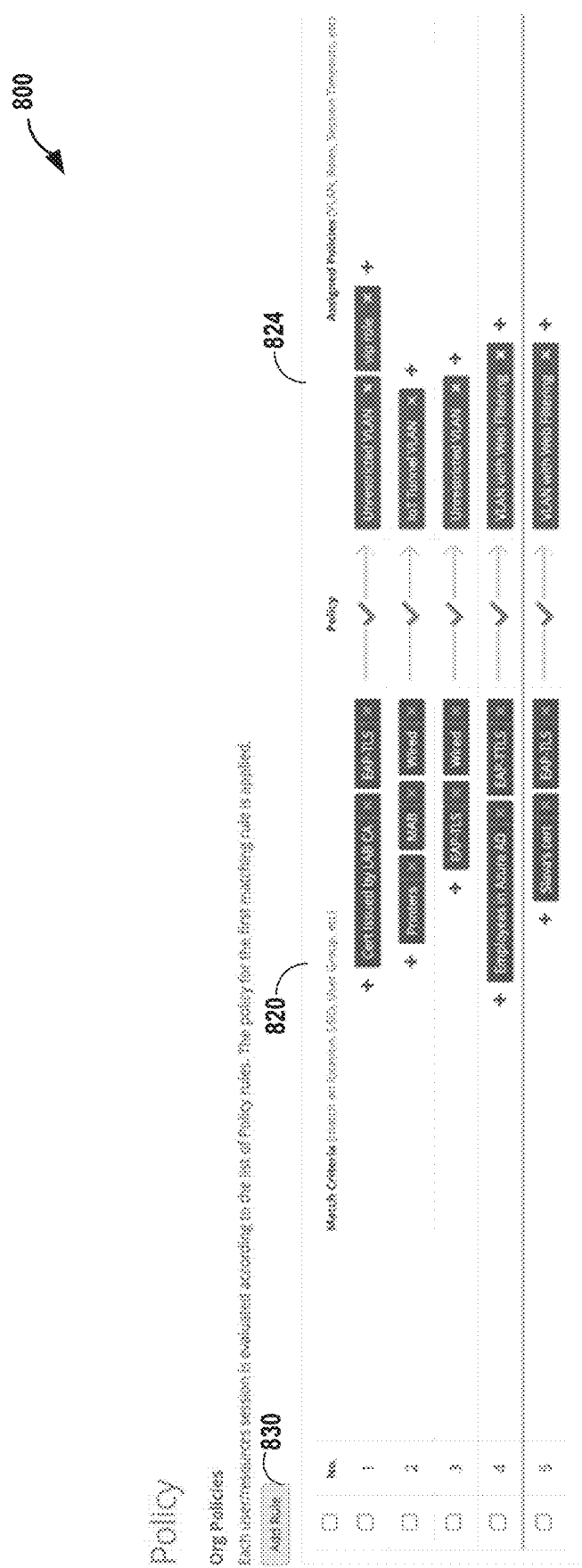
FIG. 8 illustrates an example user interface provided by the NMS to enable configuration of intent-based NAC policies based on labels, in accordance with the techniques of this disclosure.

FIG. 8 illustrates an example user interface provided by NMS 130/300 for display on admin device 111 to enable configuration of intent-based NAC policies based on labels, in accordance with the techniques of this disclosure. FIG. 8 illustrates an intent-based policy user interface (UI) 800 that presents a list of intent-based NAC policies of an organization with the sets of normalized match rules or match criteria 820 on the left side of UI 800 and the corresponding sets of abstracted policy results or assigned policies 824 on the right side of UI 800.

In the illustrated example, match rules or match criteria 820 for each of the intent-based NAC policies comprise one or more labels representative of authentication policy rules of the organization, such as authentication type or identity provider, and/or a group name of the authorization policy rules of the organization. For example, for some of the intent-based NAC policies, the labels included in the match rule or match criteria 820 are representative of authentication types (e.g., Wireless 802.1X, Wired, EAP-TLS, EAP-TTLS, MAB, certificates) and/or authorization groups (e.g., Printers, Employees, Contractors). Policy results or assigned policies 824 for each of the intent-based NAC policies comprise one or more labels representative of VLANs and/or roles of the authorization policy rules of the organization. For example, for some of the intent-based NAC policies, the labels included in the policy results or assigned polices 824 are representative of VLANs (e.g., Employee VLAN, Contractor VLAN, Unrestricted VLAN, IoT Tunnel VLAN, VLAN with Web Filtering) and/or roles (e.g., Employee role, Contractor role, VIP role).

In order to configure a new intent-based NAC policy, a network administrator using admin device 111 may select the "Add Rule" button 826. NMS 130/300 may then, via UI 800 or another user interface, receive data indicative of selection of one or more labels representative of one or more authentication policy rules, such as an authentication type and/or an identity provider, for the new intent-based NAC policy, and receive data indicative of selection of one or more labels representative of one or more authorization policy rules, such as a group name, a VLAN, and/or a role, for the new intent-based NAC policy. Upon receipt of the selected labels, NMS 130/300 may configure a set of normalized match rules or match criteria 820 of the new intent-based NAC policy based on the selected labels representative of the authentication policy rules and/or the group name of the authorization policy rules. For the set of normalized match rules, NMS 130/300 then configures a corresponding set of abstracted policy results or assigned policies 824 of the new intent-based NAC policy based on the selected labels representative of the VLANs and/or roles of the authorization policy rules.

Figure 9A:
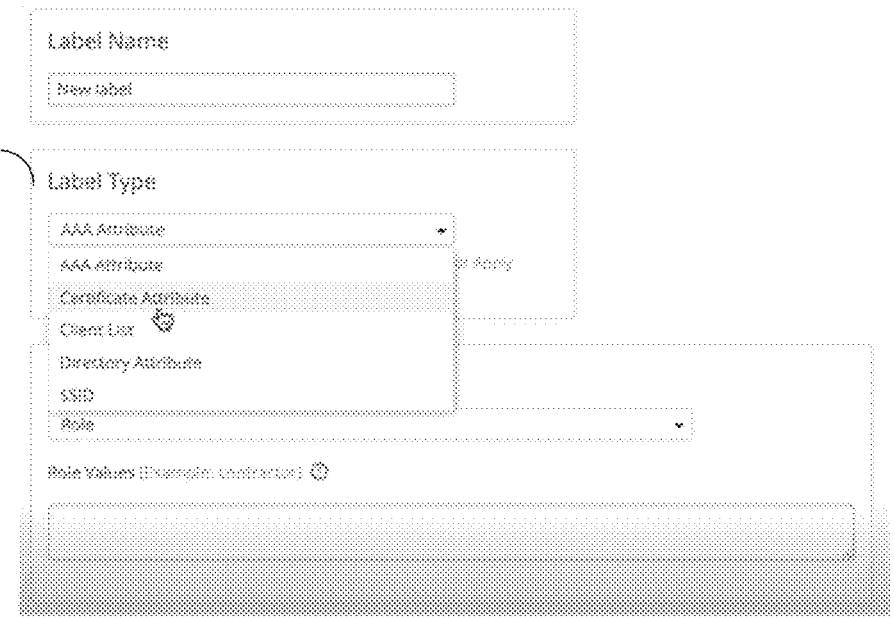
FIGS. 9A and 9B illustrate an example user interface provided by the NMS to enable configuration of a new label, including selection of a label type for the new label and selection of a label value for the new label, in accordance with the techniques of this disclosure.
Figure 9B:
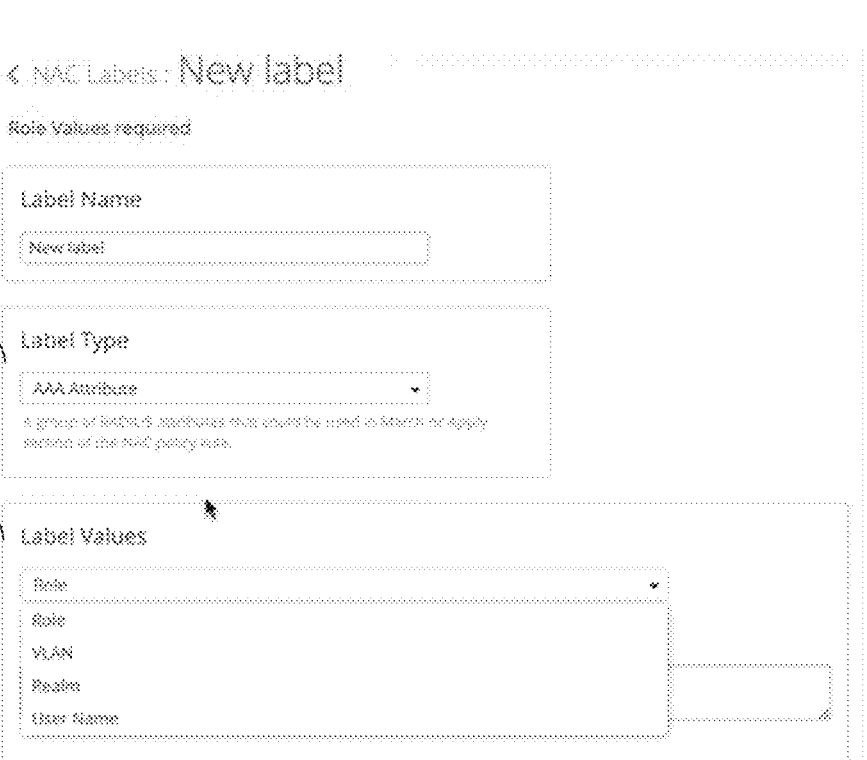

FIGS. 9A and 9B illustrate an example user interface provided by NMS 130/300 for display on admin device 111 to enable configuration of a new label, including selection of a label type for the new label and selection of a label value for the new label, in accordance with the techniques of this disclosure. The new label may be available for selection via intent-based policy UI 800 of FIG. 8 for inclusion in the set of match rules or the set of policy results of an intent-based NAC policy.

FIG. 9A illustrates a new label user interface (UI) 900A with a Label Type region 910 illustrated with an expanded drop-down list of label type selection options for the new label. In the example of FIG. 9A, the label type selection options include AAA attribute, Certificate attribute, Client List, Directory Attribute, SSID.

FIG. 9B illustrates the new label UI 900B with Label Type region 910 indicating a selected label type of "AAA Attribute," and a Label Values region 915 illustrated with an expanded drop-down list of label value selection options for the new label. In the example of FIG. 9B, the label type selection options for the AAA Attribute label type include Role, VLAN, Realm, User Name. In some examples, Label Values region 915 includes a fillable field to receive actual values for the selected label type and the selected label value.

that presents a list of intent-based NAC policies of an organization with the sets of normalized match rules or match criteria 820 on the left side of UI 800 and the corresponding sets of abstracted policy results or assigned policies 824 on the right side of UI 800.

Figure 10:
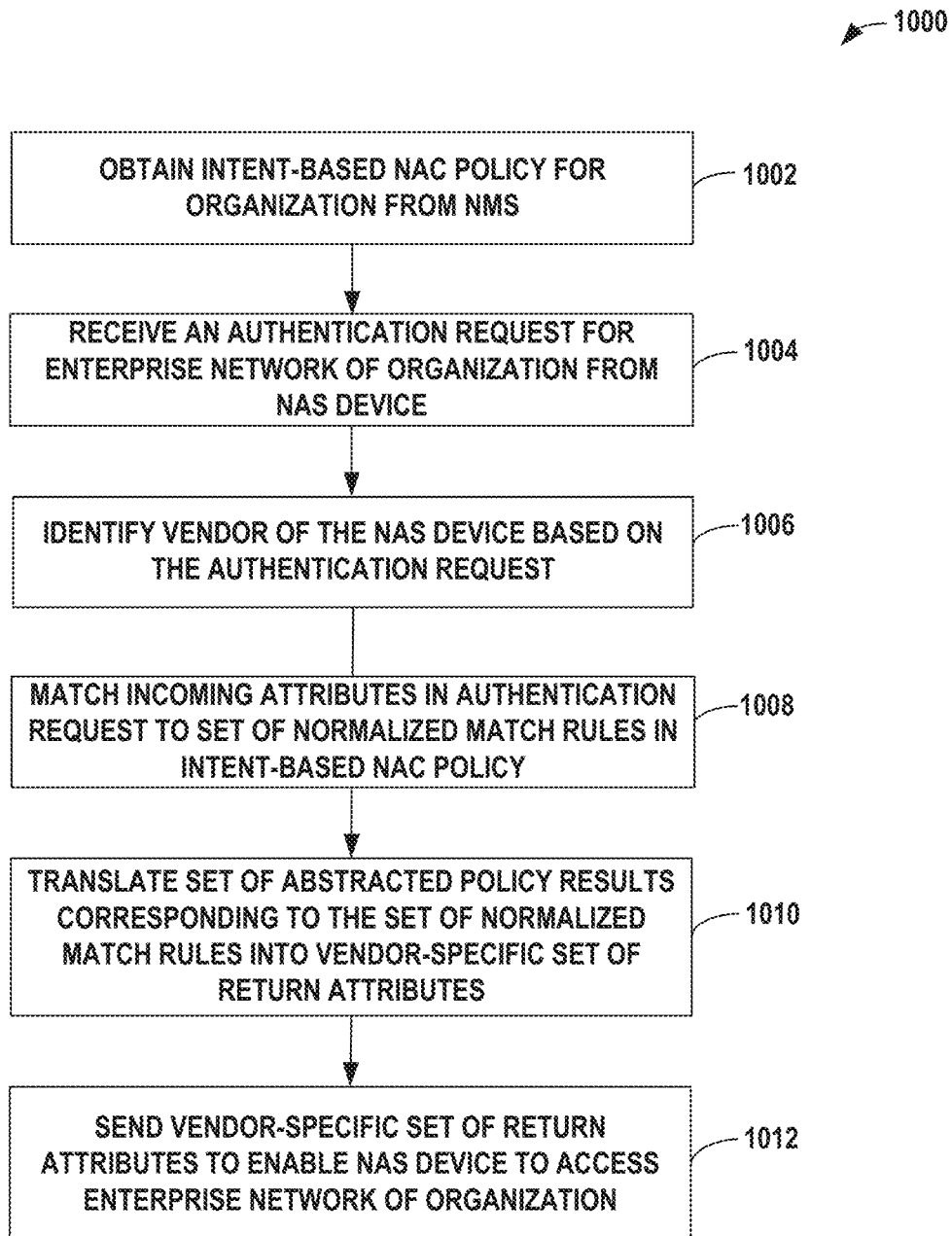
FIG. 10 is a flow chart illustrating an example operation of application of applying an intent-based NAC policy in response to receipt of an authentication request from a NAS device, in accordance with one or more techniques of this disclosure.

FIG. 10 is a flow chart illustrating an example operation of application of applying an intent-based NAC policy in response to receipt of an authentication request from a NAS device, in accordance with one or more techniques of this disclosure. The example operation of FIG. 10 is described herein with respect to NAC system 200 of FIG. 2 and NMS 300 of FIG. 3. In other examples, the operation of FIG. 10 may be performed by other computing systems or devices configured, such as NAC systems 180 and NMS 130 from FIGS. 1A-1B.

NAC system 200 obtains one or more intent-based NAC policies of an organization of the one or more organizations from NMS 300, wherein the one or more intent-based NAC policies comprise one or more sets of normalized match rules with corresponding sets of abstracted policy results that are vendor-agnostic (1002). NMS 300 generates data representative of a user interface 310 for display on admin device 111, and configures, based on data received from admin device 111 via user interface 310, the one or more intent-based NAC policies of the organization. NAC system 200 obtains configuration information 317 for the organization from NMS 300 in response to receipt of the authentication request for the enterprise network of the organization from the NAS device, wherein the configuration information 317 for the organization includes the one or more intent-based NAC policies of the organization.

NAC system 200 receives an authentication request for an enterprise network of the organization from a NAS device (1004). NAC system 200 identifies a vendor of the NAS device based on the authentication request (1006). For example, NAC system 200 may match one or more features of the authentication request received from the NAS device to a vendor signature of the vendor of the NAS device included in a database of vendor signatures 219 stored at NAC system 200, wherein the one or more features of the authentication request at least include the one or more incoming attributes.

NAC system 200 matches one or more incoming attributes included in the authentication request from the NAS device to a set of normalized match rules of an intent-based NAC policy of the one or more intent-based NAC policies (1008). For example, NAC system 200 may translate the one or more sets of normalized match rules of the one or more intent-based NAC policies of the organization into one or more vendor-specific sets of incoming attributes based on the vendor of the NAS device, and match the one or more incoming attributes included in the authentication request from the NAS device to a vendor-specific set of incoming attributes translated from the set of normalized match rules of the intent-based. NAC policy of the one or more intent-based NAC policies. NAC system 200 translates a set of abstracted policy results corresponding to the set of normalized match rules of the intent-based NAC policy into a vendor-specific set of return attributes based on the vendor of the NAS device (1010). NAC system 200 sends the vendor-specific set of return attributes to the NAS device to enable the NAS device to access the enterprise network of the organization (1012).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively, or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random-access memory (RAM), read-only memory (ROM), non-volatile random-access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
 a network management system (NMS) configured to manage a plurality of multi-vendor, network access server (NAS) devices associated with one or more organizations; and
 at least one cloud-based network access control (NAC) system in communication with the NMS, wherein the at least one NAC system is configured to:
  obtain, from the NMS, one or more intent-based NAC policies of an organization of the one or more organizations, wherein the one or more intent-based NAC policies comprise one or more sets of normalized match rules associated with corresponding sets of abstracted policy results that are vendor-agnostic;
  receive an authentication request for an enterprise network of the organization from a NAS device;
  identify a vendor of the NAS device based on the authentication request;
  match one or more incoming attributes included in the authentication request from the NAS device to a set of normalized match rules of an intent-based NAC policy of the one or more intent-based NAC policies;
  translate a set of abstracted policy results corresponding to the set of normalized match rules of the intent-based NAC policy into a vendor-specific set of return attributes based on the vendor of the NAS device; and
  send the vendor-specific set of return attributes to the NAS device to enable the NAS device to access the enterprise network of the organization.

2. The system of claim 1, wherein the set of normalized match rules of the intent-based NAC policy comprises both authentication rules and authorization rules normalized to be vendor-agnostic.

3. The system of claim 1, wherein the vendor-specific set of return attributes includes at least one vendor-specific attribute of the vendor of the NAS device.

4. The system of claim 1, wherein the at least one NAC system is configured to:
 identify a type of the NAS device based on the one or more incoming attributes included in the authentication request; and
 translate the set of abstracted policy results into the vendor-specific set of return attributes based on the vendor of the NAS device and the type of the NAS device.

5. The system of claim 1, wherein to match the one or more incoming attributes to the set of normalized match rules of the intent-based NAC policy, the at least one NAC system is configured to:
 translate the one or more sets of normalized match rules of the one or more intent-based NAC policies of the organization into one or more vendor-specific sets of incoming attributes based on the vendor of the NAS device; and
 match the one or more incoming attributes included in the authentication request from the NAS device to a vendor-specific set of incoming attributes translated from the set of normalized match rules of the intent-based NAC policy of the one or more intent-based NAC policies.

6. The system of claim 1, wherein the vendor of the NAS device comprises a first vendor, and wherein the at least one NAC system is configured to:
 receive a second authentication request for the enterprise network of the organization from a second NAS device;
 identify a second vendor of the second NAS device based on the second authentication request, wherein the second vendor is different than the first vendor;
 match one or more incoming attributes included in the second authentication request from the second NAS device to the set of normalized match rules in the same intent-based NAC policy of the one or more NAC policies;
 translate the set of abstracted policy results corresponding to the set of normalized match rules of the intent-based NAC policy into a second vendor-specific set of return attributes based on the second vendor of the second NAS device; and send the second vendor-specific set of return attributes to the second NAS device to enable the second NAS device to access the enterprise network of the organization.

7. The system of claim 1, wherein, to identify the vendor of the NAS device based on the authentication request, the at least one NAC system is configured to match one or more features of the authentication request received from the NAS device to a vendor signature of the vendor of the NAS device included in a vendor signature database stored at the at least one NAC system, wherein the one or more features of the authentication request at least include the one or more incoming attributes.

8. The system of claim 7, wherein the NMS is configured to periodically update vendor signatures included in the vendor signature database at the at least one NAC system.

9. The system of claim 1, wherein the NMS is configured to:
generate data representative of a user interface for display on a computing device of a network administrator of the enterprise network of the organization; and
configure, based on data received from the computing device via the user interface, the one or more intent-based NAC policies of the organization.

10. The system of claim 9, wherein to configure the one or more intent-based NAC policies of the organization, the NMS is further configured to:
receive, from the computing device via the user interface, data indicative of selection of one or more labels representative of authentication rules of the organization, the authentication rules including authentication types and identity providers;
receive, from the computing device via the user interface, data indicative of selection of one or more labels representative of authorization rules of the organization, the authorization rules including group names, virtual local area networks (VLANs), and roles;
configure the one or more sets of normalized match rules of the one or more intent-based NAC policies of the organization based on the selected one or more labels representative of the authentication rules of the organization and the group names from the authorization rules of the organization; and
for each set of the one or more sets of normalized match rules, configure a corresponding set of the one or more sets of abstracted policy results of the one or more intent-based NAC policies of the organization based on the selected one or more labels representative of the VLANs and roles from the authorization rules of the organization.

11. The system of claim 1, wherein to obtain the one or more intent-based NAC policies of the organization from the NMS, the at least one NAC system is configured to obtain configuration information for the organization from the NMS in response to receipt of the authentication request for the enterprise network of the organization from the NAS device, wherein the configuration information for the organization includes the one or more intent-based NAC policies of the organization.

12. The system of claim 1, wherein the NMS is configured to periodically update the one or more intent-based NAC policies of the organization at the at least one NAC system.

13. A method comprising:
obtaining, by a cloud-based network access control (NAC) system, one or more intent-based NAC policies of an organization from a network management system (NMS) configured to manage a plurality of multi-vendor, network access server (NAS) devices associated with the organization, wherein the one or more intent-based NAC policies comprise one or more sets of normalized match rules associated with corresponding sets of abstracted policy results that are vendor-agnostic;
receiving, by the NAC system, an authentication request for an enterprise network of the organization from a NAS device;
identifying, by the NAC system, a vendor of the NAS device based on the authentication request;
matching, by the NAC system, one or more incoming attributes included in the authentication request from the NAS device to a set of normalized match rules of an intent-based NAC policy of the one or more intent-based NAC policies;
translating, by the NAC system, a set of abstracted policy results corresponding to the set of normalized match rules of the intent-based NAC policy into a vendor-specific set of return attributes based on the vendor of the NAS device; and
sending, by the NAC system, the vendor-specific set of return attributes to the NAS device to enable the NAS device to access the enterprise network of the organization.

14. The method of claim 13, further comprising to identifying a type of the NAS device based on the one or more incoming attributes included in the authentication request, wherein translating the set of abstracted policy results comprises translating the set of abstracted policy results into the vendor-specific set of return attributes based on the vendor of the NAS device and the type of the NAS device.

15. The method of claim 13, wherein matching the One or more incoming attributes to the set of normalized match rules of the intent-based NAC policy comprises:
translating the one or more sets of normalized match rules of the one or more intent-based NAC policies of the organization into one or more vendor-specific sets of incoming attributes based on the vendor of the NAS device; and
matching the one or more incoming attributes included in the authentication request from the NAS device to a vendor-specific set of incoming attributes translated from the set of normalized match rules of the intent-based NAC policy of the one or more intent-based NAC policies.

16. The method of claim 13, wherein identifying the vendor of the NAS device based on the authentication request comprises matching one or more features of the authentication request received from the NAS device to a vendor signature of the vendor of the NAS device included in a vendor signature database stored at the at least one NAC system, wherein the one or more features of the authentication request at least include the one or more incoming attributes.

17. The method of claim 13, further comprising:
generating, by the NMS, data representative of a user interface for display on a computing device of a network administrator of the enterprise network of the organization; and
configuring, by the NMS and based on data received from the computing device via the user interface, the one or more intent-based NAC policies of the organization.

18. The method of claim 17, wherein configuring the one or more intent-based NAC policies of the organization comprises:

receiving, from the computing device via the user interface, data indicative of selection of one or more labels representative of authentication rules of the organization, the authentication rules including authentication types and identity providers;

receiving, from the computing device via the user interface, data indicative of selection of one or more labels representative of authorization rules of the organization, the authorization rules including group names, virtual local area networks (VLANs), and roles;

configuring the one or more sets of normalized match rules of the one or more intent-based NAC policies of the organization based on the selected one or more labels representative of the authentication rules of the organization and the group names from the authorization rules of the organization; and for each set of the one or more sets of normalized match rules, configuring a corresponding set of the one or more sets of abstracted policy results of the one or more intent-based NAC policies of the organization based on the selected one or more labels representative of the VLANs and roles from the authorization rules of the organization.

19. The method of claim 13, wherein obtaining the one or more intent-based NAC policies of the organization from the NMS comprising obtaining configuration information for the organization from the NMS in response to receipt of the authentication request for the enterprise network of the organization from the NAS device, wherein the configuration information for the organization includes the one or more intent-based NAC policies of the organization.

20. A non-transitory computer-readable storage medium storing instructions that, when executed, cause one or more processors to:

obtain, by a cloud-based network access control (NAC) system, one or more intent-based NAC policies of an organization from a network management system (NMS) configured to manage a plurality of multi-vendor, network access server (NAS) devices associated with the organization, wherein the one or more intent-based NAC policies comprise one or more sets of normalized match rules associated with corresponding sets of abstracted policy results that are vendor-agnostic;

receive an authentication request for an enterprise network of the organization from a NAS device;

identify a vendor of the NAS device based on the authentication request;

match one or more incoming attributes included in the authentication request from the NAS device to a set of normalized match rules of an intent-based NAC policy of the one or more intent-based NAC policies;

translate a set of abstracted policy results corresponding to the set of normalized match rules of the intent-based NAC policy into a vendor-specific set of return attributes based on the vendor of the NAS device; and send the vendor-specific set of return attributes to the NAS device to enable the NAS device to access the enterprise network of the organization.

* * * * *